(12) United States Patent
Bae et al.

(10) Patent No.: US 9,529,491 B2
(45) Date of Patent: Dec. 27, 2016

(54) SCREEN DISPLAY METHOD AND ELECTRONIC DEVICE SUPPORTING SAME

(71) Applicant: Samsung Electronics Co., Ltd., Gyeonggi-do (KR)

(72) Inventors: Soo Jung Bae, Seoul (KR); Kyung Lim Choi, Incheon (KR); Wan Kyu Kim, Gyeonggi-do (KR); Jeong Hyo Kim, Seoul (KR); Jee Won Lee, Seoul (KR); Hui Chul Yang, Gyeonggi-do (KR)

(73) Assignee: Samsung Electronics Co. Ltd (KR)

( * ) Notice: Subject to any disclaimer, the term of this patent is extended or adjusted under 35 U.S.C. 154(b) by 71 days.

(21) Appl. No.: 14/587,312

(22) Filed: Dec. 31, 2014

(65) Prior Publication Data

US 2015/0185969 A1    Jul. 2, 2015

(30) Foreign Application Priority Data

Dec. 31, 2013 (KR) .......... 10-2013-0167996
Jan. 6, 2014 (KR) .......... 10-2014-0001527

(51) Int. Cl.
*G06F 3/048* (2013.01)
*G06F 3/0481* (2013.01)
*H04M 1/725* (2006.01)
*H04M 1/67* (2006.01)

(52) U.S. Cl.
CPC ........ *G06F 3/0481* (2013.01); *H04M 1/72519* (2013.01); *H04M 1/72544* (2013.01); *H04M 1/67* (2013.01); *H04M 1/72577* (2013.01); *H04M 1/72597* (2013.01)

(58) Field of Classification Search
CPC .......................... G06F 3/0481; H04M 1/72597
See application file for complete search history.

(56) References Cited

U.S. PATENT DOCUMENTS

| | | | |
|---|---|---|---|
| 2009/0265666 A1 | 10/2009 | Hsieh et al. | |
| 2010/0248688 A1 | 9/2010 | Teng et al. | |
| 2010/0257490 A1 | 10/2010 | Lyon et al. | |
| 2011/0256848 A1* | 10/2011 | Bok ................ | G06F 3/04883 455/411 |
| 2012/0084734 A1* | 4/2012 | Wilairat .............. | G06F 21/36 715/863 |
| 2013/0268865 A1 | 10/2013 | Rhim et al. | |
| 2014/0191970 A1* | 7/2014 | Cho .................... | G06F 3/0488 345/163 |
| 2014/0283112 A1* | 9/2014 | Wang .................. | G06F 21/84 726/27 |

(Continued)

FOREIGN PATENT DOCUMENTS

| | | |
|---|---|---|
| EP | 2 144 148 | 1/2010 |
| KR | 1020130075340 | 7/2013 |

OTHER PUBLICATIONS

European Search Report dated Apr. 30, 2015 issued in counterpart application No. 14200728.5-1959.

*Primary Examiner* — Omar Abdul-Ali
(74) *Attorney, Agent, or Firm* — The Farrell Law Firm, P.C.

(57) ABSTRACT

Methods and apparatuses are provided for displaying a screen on an electronic device. A locked screen is displayed on which at least one object is arranged. A location is determined on the locked screen at which event information corresponding to an event is displayed, based on an attribute of the at least one object, when the event occurs.

18 Claims, 14 Drawing Sheets

(56) References Cited

U.S. PATENT DOCUMENTS

2015/0017962 A1\* 1/2015 Howard ................ H04W 8/22
 455/418
2015/0058789 A1\* 2/2015 Namgung ............ G06F 3/0488
 715/781

\* cited by examiner

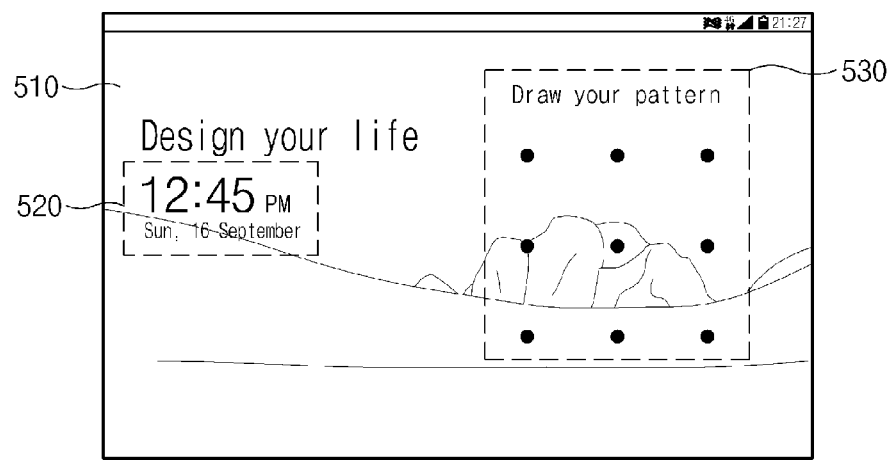
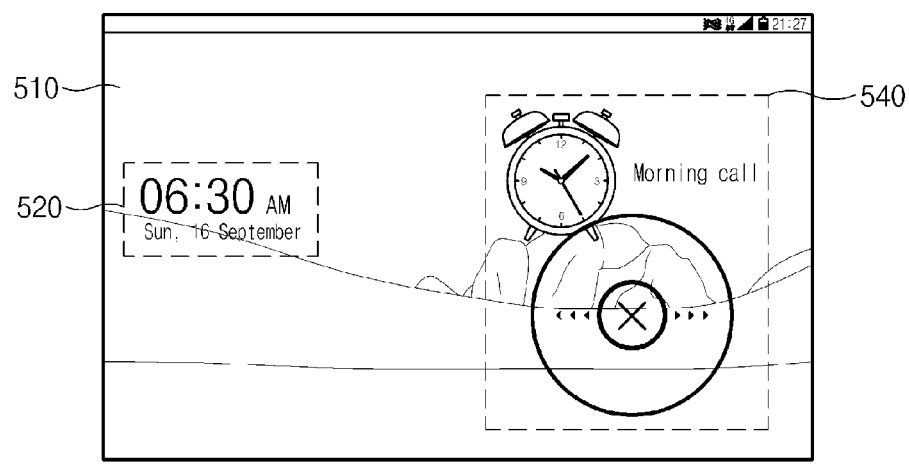
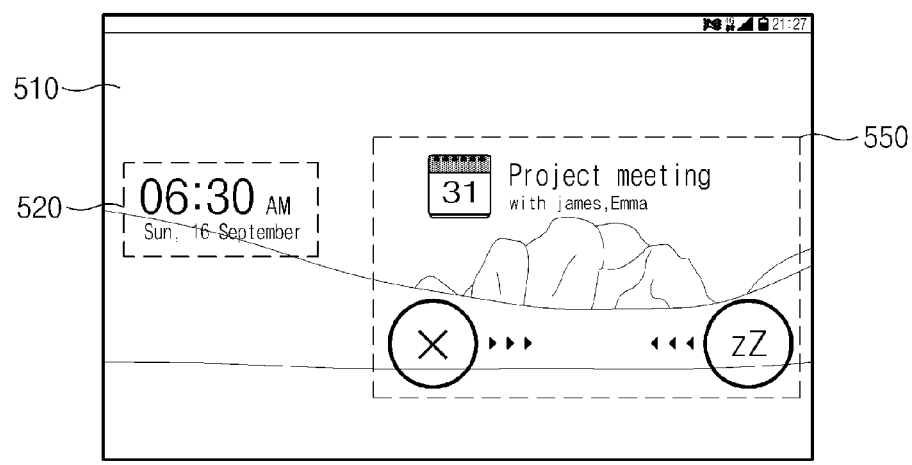
Fig.5

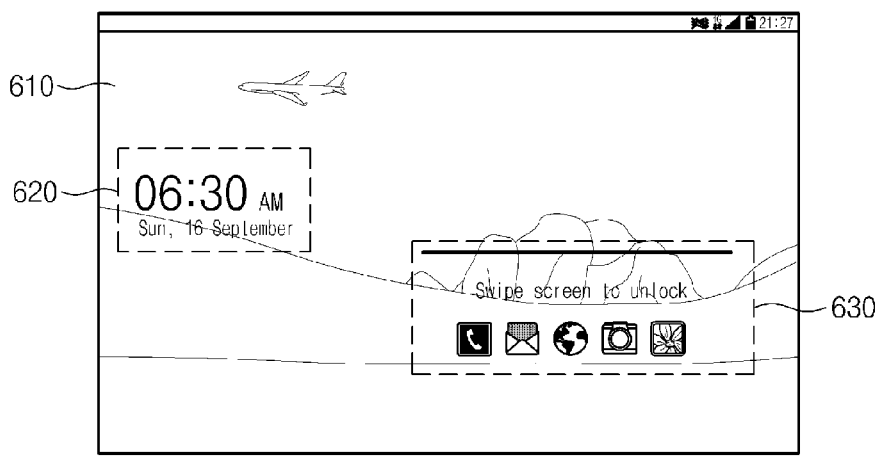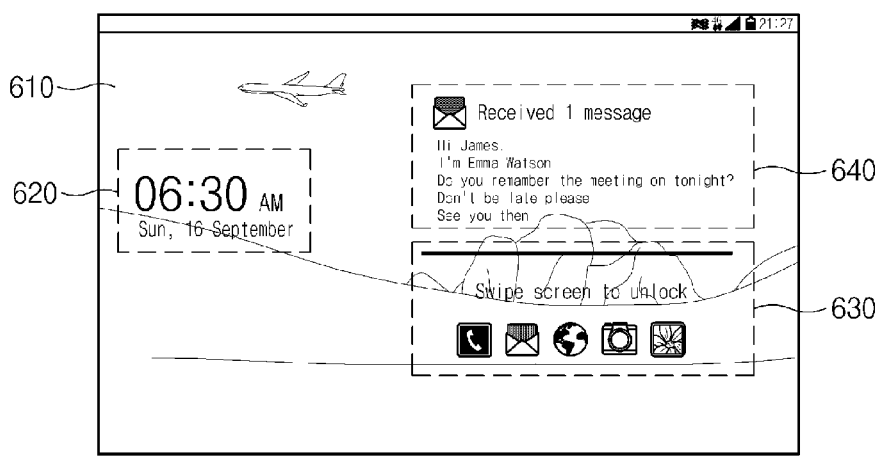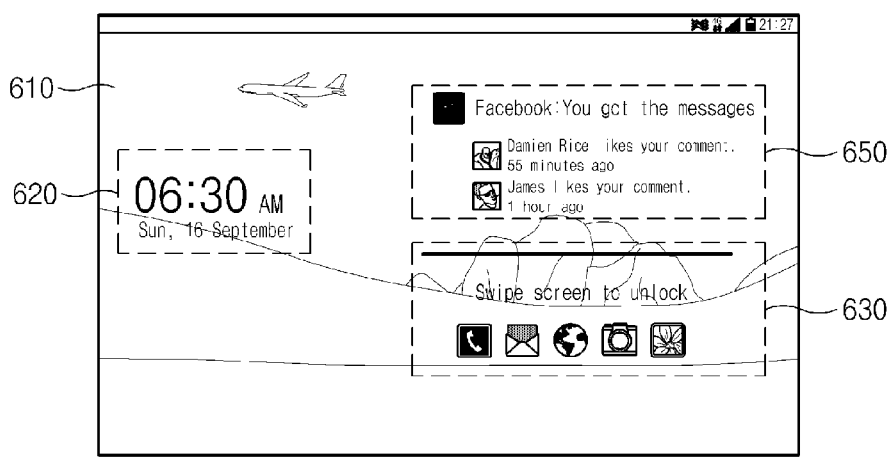
Fig.6

SCREEN DISPLAY METHOD AND ELECTRONIC DEVICE SUPPORTING SAME

PRIORITY

This application claims priority under 35 U.S.C. §119(a) to Korean Patent Application Nos. 10-2013-0167996, filed on Dec. 31, 2013, and 10-2014-0001527, filed on Jan. 6, 2014, the contents of which are incorporated herein by reference.

BACKGROUND OF THE INVENTION

1. Field of the Invention

The present disclosure relates generally to a screen display of an electronic device, and more particularly, to the display of event information on a function screen of an electronic device.

2. Description of the Related Art

An electronic device includes a display module. When performing a specific function, the electronic device displays a specified screen through the display module.

When displaying a screen, a typical electronic device provides a rapid change to a new screen when an event is received and processed. Accordingly, a user may experience confusion due to the rapid change in screens.

SUMMARY OF THE INVENTION

The present invention has been made to address at least the above problems and/or disadvantages and to provide at least the advantages described below. Accordingly, an aspect of the present invention provides a screen display method that enables a user to perceive a screen change more naturally by changing a portion of a screen which displays a screen element according to receiving or processing an event that has occurred, and an electronic device supporting the same.

Another aspect of the present invention provides a screen display method that may process a screen change caused by receiving or processing an event on a locked screen, depending on the locked screen, and an electronic device supporting the same.

According to an embodiment of the present invention, a screen display method is provided. A locked screen is displayed on which at least one object is arranged. A location is determined on the locked screen at which event information corresponding to an event is displayed, based on an attribute of the at least one object, when the event occurs.

According to another embodiment of the present invention, an electronic device is provided that includes a memory and a processor coupled to the memory. The processor is configured to display a locked screen on which at least one object is arranged, and determine a location on the locked screen at which to display event information corresponding to an event, based on an attribute of the at least one object, when the event occurs.

According to another embodiment of the present invention, an article of manufacture is provided for displaying a screen of an electronic device. The article of manufacture includes a machine readable medium containing one or more programs which when executed implement the steps of: displaying a locked screen on which at least one object is arranged; and determining a location on the locked screen at which event information corresponding to an event is displayed, based on an attribute of the at least one object, when the event occurs.

BRIEF DESCRIPTION OF THE DRAWINGS

The above and other aspects, features, and advantages of the present invention will be more apparent from the following detailed description when taken in conjunction with the accompanying drawings, in which:

FIG. 5 is a diagram illustrating reception and processing of a time function related event, according to an embodiment of the present invention;

FIG. 6 is a diagram illustrating independent display of function related event information, according to an embodiment of the present invention;

DETAILED DESCRIPTION OF EMBODIMENTS OF THE PRESENT INVENTION

Figure 1:
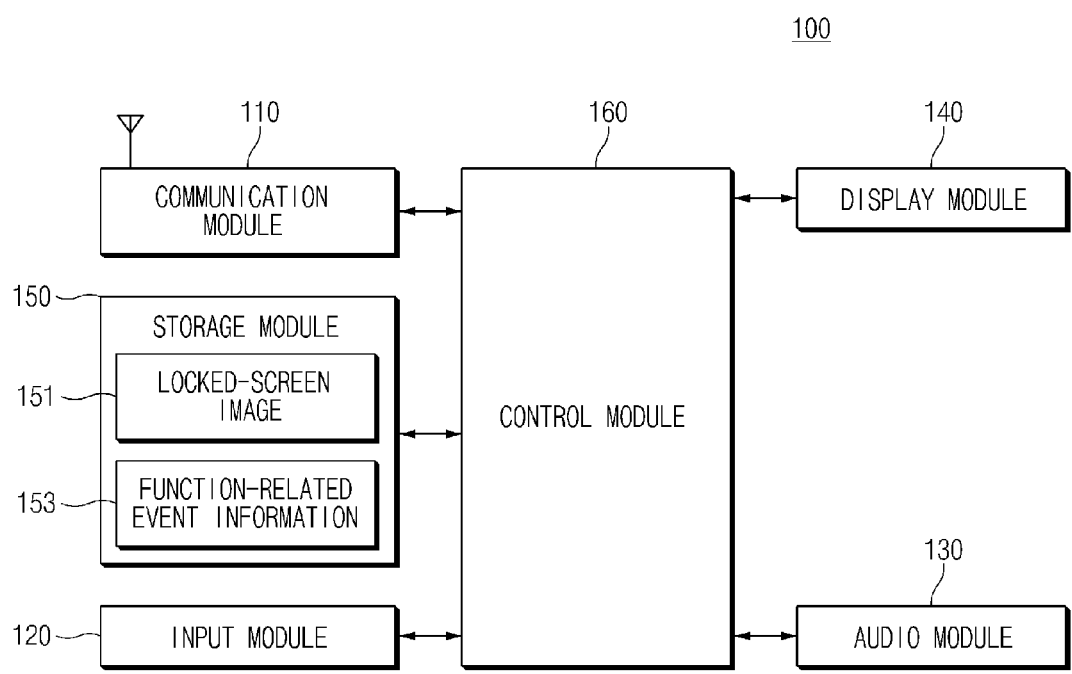
FIG. 1 is a diagram illustrating an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The expressions "include" and "may include", as used herein, indicate the presence of a corresponding function, operation, or component, but do not exclude one or more additional functions, operations, or components. Also, it should be understood that the term "includes" or "has" indicates the presence of characteristics, numbers, steps, operations, components, parts, or combinations thereof, but does not exclude the presence or addition of one or more other characteristics, numbers, steps, operations, components, parts, or combinations thereof.

The expression "or", as used herein, includes any and all combinations of enumerated words. For example, the expression "A or B" may include A, B, or both A and B.

The expressions "a first", "a second", "firstly", and "secondly", as used herein, may modify various components of the present invention, but do not limit corresponding components. For example, the expressions above do not limit the order and/or importance of corresponding components. The expressions above may be used to distinguish one component from another component. For example, a first component may be called a second component and similarly, the second component may also be called the first component.

When any component is referred to as being "associated with", "connected to" or "accessed by" another component, it should be understood that the former can be directly connected to or accessed by the latter, or there may be one or more other components in between. On the contrary, when any component is referred to as being "directly connected to" or "directly accessed by" another component, it should be understood that there may be no other component in between.

The terms used herein are used only to describe specific embodiments of the present invention and are not intended to limit the present invention. The terms in singular form include the plural form unless otherwise specified.

Unless otherwise defined herein, all terms used herein, including technical or scientific terms, have the same meanings as those generally understood by a person skilled in the art. Terms defined in generally used dictionaries should be construed to have meanings matching contextual meanings in the conventional art, and should not be construed as having an ideal or excessively formal meaning unless otherwise defined herein.

An electronic device, according to an embodiment of the present invention, may be a device that includes a display function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an MP3 player, a mobile medical device, a camera, and a wearable device (e.g., a Head-Mounted-Device (HMD) such as electronic glasses, electronic clothing, an electronic bracelet, an electronic necklace, an electronic "appcessory", an electronic tattoo, or a smart watch).

According to an embodiment of the present invention, the electronic device may be a smart home appliance having a display function. The smart home appliance may include, for example, at least one of a TV set, a Digital Versatile Disc (DVD) player, an audio set, a refrigerator, an air conditioner, a cleaner, an oven, a microwave oven, a washing machine, an air cleaner, a set-top box, a TV box, a game console, an electronic dictionary, an electronic key, a camcorder, and an electronic frame.

According to an embodiment of the present invention, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigation system, a Global Positioning System (GPS) receiver, an Event Data Recorder (EDR), a Flight Data Recorder (FDR), a car infotainment device, electronic equipment for a ship (e.g., a navigation device or gyro compass for a ship), avionics, a security device, a head unit for a vehicle, an industrial or home robot, a financial institution's Automated Teller Machine (ATM) or a store's Point Of Sales (POS) device.

According to an embodiment of the present invention, the electronic device may include at least one of a portion of a building/structure or furniture including a display function, an electronic board, an electronic signature receiving device, a projector, and various measurement devices (e.g., a water, electricity, gas or electric wave measurement device). An electronic device, according to an embodiment of the present invention, may be one or more combinations of the above-described various devices. Moreover, the electronic device may be a flexible device. Also, it is obvious to a person ordinarily skilled in the art that the electronic device, according to the embodiments of the present invention, is not limited to the above-described devices.

In the following, electronic devices are discussed with reference to the accompanying drawings. The term "user" may mean a person who uses an electronic device or a device (e.g., an artificial intelligence electronic device) that uses the electronic device.

FIG. 1 is a diagram illustrating an electronic device, according to an embodiment of the present invention.

Referring to FIG. 1, an electronic device 100 includes a communication module 110, an input module 120, an audio module 130, a display module 140, a storage module 150, and a control module 160.

When a specific event, such as an event related to a specific function performed by the electronic device 100, occurs, the electronic device 100 may display a screen component corresponding to the event. It is possible to minimize a change in an object on a specific function screen or display the screen component depending on the specific function screen. According to an embodiment of the present invention, the electronic device 100 may display a screen component corresponding to an event, such as event information, instead of at least one object on the specific function screen. Also, the electronic device 100 may display the event information on an area in which at least one object included in the specific function related screen is not arranged. According to an embodiment of the present invention, the event may include at least one of an event related to a communication function and an event related to a specified time set termination. The event information may include at least one of a text or an image, as a screen component. The function related screen is a screen related to performing a specific function of the electronic device 100, and may include at least one of a locked screen, a home screen, and a specific app execution screen.

According to an embodiment of the present invention, the electronic device 100 may enable the minimization of a screen change and facilitate information recognition according to event reception. In the following, the locked screen is described as an example of the specific function related screen. However, embodiments of the present invention are not limited thereto. The locked screen may be replaced with a specified screen set by default by a user or the electronic device 100, such as a photo-album screen or a painting-album screen. The locked screen or the specified screen that includes the photo-album screen or the painting-album screen may be a screen that includes a plurality of objects. The replacement display function described above may include a function of removing at least one object (hiding an object from a display module) and displaying event information on an area in which a removed object had been arranged. Alternatively, the replacement display function may include a function of maintaining the display of at least one object and displaying the object to be covered by event information.

The communication module 110 may support the communication function of the electronic device 100. The communication module 110 may also be omitted according to whether the electronic device 100 supports a communication function. According to an embodiment of the present invention, the communication module 110 may receive a call connection request message. The communication module 110 may receive a text message, a chatting message, or a Social Network Service (SNS) message. A notice of the reception of the call connection request message, text message, chatting message, or SNS message received by the communication module 110 and the received messages may be displayed on the display module 140, according to the control of the control module 160. Also, the communication module 110 may receive an e-mail. The notice of the reception of the e-mail and the content of the received e-mail may be displayed on the display module 140, according to the control of the control module 160.

According to an embodiment of the present invention, the communication module 110 may receive a specific message, for example, a schedule message, from an external server device or another electronic device. The schedule message may contain a message received from an external server device or the content of a schedule made by a user of another electronic device. When the schedule message is received, a notice of the reception of the schedule message or a received schedule message may be displayed on the display module 140, according to the control of the control module 160. According to an embodiment of the present invention, the communication module 110 may receive a wake-up call message (or a call message related to a morning call service). The wake-up call message may be received from a base station or a server device provided for supporting the communication function of the electronic device 100. When the wake-up call message is received, the display module 140 and the audio module 130 may display information related to a notice of the reception of a corresponding message and output a sound for a wake-up call.

The input module 120 may generate an input signal of the electronic device 100. The input module 120 may include at least one of a key button, a touch key, or a touch keypad. Also, the input module 120 may include an electronic pen and a pen panel. The input module 120 may also include a voice recognition module and a microphone. The input module 120 may further include a touch screen. According to an embodiment of the present invention, the input module 120 may generate an input signal requesting a locked screen switch. The input module 120 may generate an input signal requesting the unlocking of the locked screen. The input module 120 may generate an input signal selecting at least one object included in the locked screen.

According to an embodiment of the present invention, the input module 120 may generate an input signal to select specific event information included in the locked screen while the locked screen is displayed. The specific event information may be information replacing at least one object included in the locked screen. The specific event information may include information providing a notice of a message or a call received according to communication function execution, or alarm information according to specified schedule commencement or alarm commencement. In the context of event information selection, the input module 120 may generate a touch event on a touch screen according to user control, and transfer the event to the control module 160.

The audio module 130 may process an audio related function of the electronic device 100. The audio module 130 may include a microphone related to supporting a call function or a recording function, or a speaker related to outputting a sound. According to an embodiment of the present invention, the audio module 130 may output various guidance sounds or provide various sound effects, according to event reception or processing. For example, when a text message, a chatting message, an e-mail message, or an SNS message is received, the audio module 130 may output a related guidance sound or provide a related sound effect. The audio module 130 may output a guidance sound related to locked screen display or locked screen unlocking, or may provide a sound effect related thereto. Outputting the guidance sound or providing the sound effect by the audio module 130 may also be omitted according to a user setting.

The display module 140 may display various screens related to the operation of the electronic device 100. The display module 140 may display a standby screen, an icon screen, or a menu screen. According to an embodiment of the present invention, the display module 140 may display a locked screen. The locked screen displayed on the display module 140 may include at least one object. For example, the locked screen may include a background image, a clock object, a date or calendar object, a pattern lock object, or a shortcut icon object. At least one object included in the locked screen may be adjusted according to a user setting or replaced with another object. For example, the background image of the locked screen may vary depending on a user choice. Also, the clock object of the locked screen may be omitted by a user choice or vary in shape, form, or color.

The display module 140 may display event information on a certain area of the locked screen in the process of displaying the locked screen, or while the locked screen is displayed. The display module 140 may replace at least one object with event information and display the event information.

According to an embodiment of the present invention, when displaying event information, the display module 140 may display a pre-designate a specific object, such as a calendar object, instead of the event information. Alternatively, when displaying event information, the display module 140 may remove a clock object and then display the event information.

According to an embodiment of the present invention, when displaying the event information, it is possible to determine according to object attributes, which object is removed or maintained. The object replaced with the event information may be an object having an information attribute configuring the locked screen. The object having the information attribute may include a clock object, or a date or calendar object. Also, according to selection, an object having a function attribute, which performs a specific function, may be maintained in association with the event information. The object having the function attribute may include a pattern lock object or a shortcut icon object, for example. When displaying the event information, the display module 140 may display at least one function attribute object configuring the locked screen in association with the event information. The display module 140 may display an image or indication having a certain shape that indicates that an object is or may be associated with the event information.

According to an embodiment of the present invention, an object to be replaced may be determined according to the type of event information. When the event information relates to an alarm function, the display module 140 may display a clock object together with the event information or may remove the clock object and then display the event information related to the corresponding alarm function. Alternatively, when the event information relates to the alarm function, the display module 140 may display the event information along with a calendar object.

The storage module 150 may store various programs and data related to the operation of the electronic device 100. For example, the storage module 150 may store the Operating System (OS) of the electronic device 100. According to an embodiment of the present invention, the storage module 150 stores a locked screen image 151 and event information 153 to be displayed on the display module 140 in association with a specific function. The locked screen image 151 may be displayed on the display module 140 as a locked screen. There may be a plurality of stored locked screen images, and the number or arrangement of objects may be adjusted. There may also be a plurality of pieces of event information corresponding to a plurality of functions. In addition, the storage module 150 may store a program related to the operation of a locked screen and a program that supports event reception and processing. The programs stored in the storage module 150 may be loaded on the control module 160 and may perform a locked screen display, the unlocking of the locked screen, and a function according to the unlocking of the locked screen. The program supporting the event reception and processing may be loaded on the control module 160, may perform the display of a specific function screen, for example, a locked screen to which the event information 153 is applied, and may process a function related to the selection of the event information 153.

The control module 160 may transfer and process data related to the control of the electronic device 100, and may process and transfer a control signal. For example, the control module 160 may perform the display of the locked screen image 151, and may perform the display of the event information 153 when the locked screen image 151 is displayed.

Figure 2:
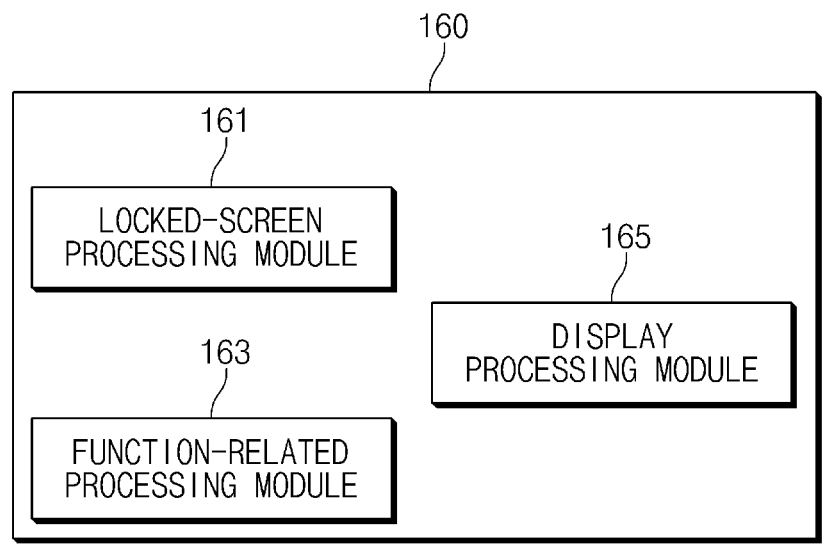
FIG. 2 is a diagram illustrating a control module, according to an embodiment of the present invention.

FIG. 2 is a diagram illustrating a control module, according to an embodiment of the present invention.

Referring to FIG. 2, the control module 160 includes a locked screen processing module 161, a function-related processing module 163, and a display processing module 165.

The locked screen processing module 161 may control the display of the locked screen image 151. For example, the locked screen processing module 161 may display the locked screen image 151 on the display module 140 when an event requesting a locked screen state switch occurs. A locked screen state switch event may include a wake-up event after a switch to a sleep state, or an event requesting a direct switch to a locked screen state. The locked screen processing module 161 may request the display processing module 165 to display the locked screen image 151 when a locked screen related event occurs.

According to an embodiment of the present invention, the locked screen processing module 161 may detect a touch event selecting at least one object included in a locked screen, while the locked screen image 151 is displayed. When a touch event occurs, the locked screen processing module 161 may perform a function according to a corresponding touch event. For example, the locked screen processing module 161 may determine whether to unlock a locked screen, according to the touch event. When the unlocking of the locked screen is determined, the locked screen processing module 161 may transfer related information to the display processing module 165, and request the display processing module 165 to remove the locked screen image 151 from the display module 140.

According to an embodiment of the present invention, the locked screen processing module 161 may perform processing related to a locked screen setting. In this context, the locked screen processing module 161 may provide a locked screen setting screen related to updating the locked screen image 151. The locked screen processing module 161 may include at least one object in the locked screen image 151 or may change at least one object, according to setting information on the locked screen setting screen.

The function-related processing module 163 may process an event that occurs on the electronic device 100. For example, when a call connection request message is received, the function-related processing module 163 may provide a notice of the reception of a corresponding message. In this context, the function-related processing module 163 may request the display processing module 165 to display the event information 153 corresponding to the call connection request message on the display module 140. The function-related processing module 163 may adjust at least one of the shape, size, and display type of the event information 153 to correspond to the current state of the electronic device 100. The function-related processing module 163 may transfer adjusted event information to the display processing module 165. Also, the function-related processing module 163 may transfer the type of the event information or characteristic information on the event information to the display processing module 165. For example, the function-related processing module 163 may transfer call event information to the display processing module 165. When a notice of message reception is received, the function-related processing module 163 may transmit a vibration corresponding to message reception or perform audio output.

According to an embodiment of the present invention, when a short text message, a multimedia message, a chatting message, an e-mail, a schedule message, or an SNS message is received, the function-related processing module 163 may provide a notice of message reception. In this context, the function-related processing module 163 may request the display processing module 165 to output event information 153 corresponding to a notice of the message reception. The function-related processing module 163 may adjust at least one of the display location, shape, and color of the event information 153 to correspond to the current state of the electronic device 100. For example, when the electronic device 100 is currently in a sleep state, the electronic device 100 has to display or is displaying a locked screen related to message reception. The function-related processing module 163 may adjust the size or shape of the event information 153 so that the event information may replace a specific object of the locked screen.

According to an embodiment of the present invention, the electronic device 100 may be in a standby screen state or an icon screen state. The function-related processing module 163 may request the display processing module 165 to display the event information 153 without separate adjustment. Alternatively, the function-related processing module 163 may adjust the event information 153 to correspond to the standby screen or icon screen state and may then transfer adjusted information to the display processing module 165. According to an embodiment of the present invention, the electronic device 100 may currently be playing music. The function-related processing module 163 may adjust the shape, size, and color of the event information 153 to correspond to an area of a music play screen where at least one object is arranged. The function-related processing module 163 may transfer location information on the area of the music play screen where at least one object is arranged, along with adjusted event information, to the display processing module 165. The function-related processing module 163 may also transmit a vibration corresponding to a notice of reception or may perform audio output, according to a message type.

According to an embodiment of the present invention, the function-related processing module 163 may sound an alarm according to a specified schedule commencement or alarm commencement. The function-related processing module 163 may determine the adjustment of at least one of the shape, color, and size of the event information 153 related to a schedule function or an alarm function, according to the current display state of the display module 140. The function-related processing module 163 may transfer adjusted event information to the display processing module 165 or may transfer the event information 153 corresponding to the schedule function or alarm function to the display processing module 165.

The display processing module 165 may receive an output request for the locked screen image 151 and the event information 153 from the locked screen processing module 161 and the function-related processing module 163, respectively. Alternatively, the display processing module 165 may receive an output request for the locked screen image 151 and adjusted event information. Alternatively, the display processing module 165 may receive an output request for the adjusted event information or the event information 153.

The display processing module 165 may control the output of the event information 153 or the adjusted event information. For example, the display processing module 165 may display the locked screen image 151 on the display module 140 and enable the adjusted event information to overlay at least one object included in the locked screen image 151. Alternatively, the display processing module 165 may remove at least one object from the locked screen image 151 and include adjusted event information in the locked screen image to create an adjusted locked screen image. The display processing module 165 may enable the adjusted locked screen image to be displayed on the display module 140.

According to an embodiment of the present invention, the display processing module 165 may replace at least one object on a specific function screen being currently displayed with adjusted event information for display. The display processing module 165 may apply adjusted event information to a specific function screen being currently displayed to create and display an adjusted function screen. Alternatively, the display processing module 165 may remove a function screen currently being displayed from the display module 140, and display the event information on the display module 140. Alternatively, the display processing module 165 may display the event information 153 on the current function screen so that the entire screen is overlaid with the event information.

In the process of outputting the event information, the above-described display processing module 165 may match the area size of at least one object included in a function screen with the size of the event information, and then output the event information. The event information may replace an area in which at least one object is arranged and displayed. In this example, the function-related processing module 163 may adjust the event information to an identifiable minimum size, or may adjust the event information to correspond to the size of an object on which the event information is arranged.

According to an embodiment of the present invention, the electronic device 100 may include a display module that displays a function screen on which at least one object is arranged, such as a locked screen, and a control module that determines, based on the attribute of the object displayed on the locked screen, at which location of the locked screen event information corresponding to an event is displayed, when the event occurs.

According to an embodiment of the present invention, the control module 160 may compare the type or attribute of the event with the type or attribute of the object, and selectively display the event information on an area where the object is arranged or on an area where the object is not arranged, according to a comparison result.

According to an embodiment of the present invention, the event may include at least one of a communication function related event and a specified time related event. Accordingly, the type or attribute of the event may be classified according to a function caused by an event. For example, the type or attribute of the event may include a call related attribute, a message related attribute, or an alarm commencement related attribute.

According to an embodiment of the present invention, the control module 160 may check the size of the at least one object arranged on the locked screen and adjust the size of the event information to correspond to the size of the at least one object.

According to an embodiment of the present invention, the display module 140 may display the event information on a part of the screen where at least one object, the size of which is identified, is arranged.

According to an embodiment of the present invention, the display module 140 may display the event information with a color associated with the background image of the locked screen.

According to an embodiment of the present invention, the control module 160 may enable the function related event information to be displayed on a part where an object corresponding to the size of the event information is arranged.

According to an embodiment of the present invention, the control module 160 may hide an object adjacent to an object relevant to the event, among objects irrelevant to the event, and display the event information on a location of the hidden object.

According to an embodiment of the present invention, the control module 160 may hide an object having an attribute irrelevant to that of the event, and display the event information on a location of the hidden object.

According to an embodiment of the present invention, the object may include at least one of a first object that has an attribute to display information, and a second object that has an attribute to execute a specific function when selected.

According to an embodiment of the present invention, the display module 140 may overlay an area where the at least one object is arranged, with the function related event information.

According to an embodiment of the present invention, the control module 160 may overlay the locked screen with a background layer on which a background image is displayed, and display the event information on the background layer.

According an embodiment of the present invention, the control module 160 may align a layer including event information, having a size corresponding to a specific object of the locked screen, with the specific object on the background layer, or may arrange the event information as a part of the background layer so that the event information is aligned with the specific object with the size of the specific object of the locked screen.

According to an embodiment of the present invention, the control module 160 may select an object to be maintained and an object to be hidden, according to the attributes of objects arranged on the locked screen, and overlay the layer on a location of the object to be hidden.

According to an embodiment of the present invention, the control module 160 may select an object to be maintained and an object to be hidden, according to the attributes of objects arranged on the locked screen, and display the event information on a location of the hidden object.

According to an embodiment of the present invention, the control module 160 may hide an object having an attribute irrelevant to that of the event, and display the event information on a location of the hidden object.

According to an embodiment of the present invention, the control module 160 may hide an object adjacent to an object relevant to the attribute of the event, among objects irrelevant to the attribute of the event, and display the event information on a location of the hidden object.

According to an embodiment of the present invention, the control module 160 may overlay the locked screen with a first layer, display the event information on the first layer, and display a background image equal to the background image of the locked screen on the first layer.

According to an embodiment of the present invention, it is possible to overlay the locked screen with a second layer including the event information having a size corresponding to a specific object of the locked screen, and it is possible to display a part of a background image corresponding to the specific object of the locked screen, on the second layer.

According to an embodiment of the present invention, the electronic device 100 of the present invention may include a display module 140 displaying a locked screen on which at least one object is arranged, and a control module 160 enabling a function-related object corresponding to a specific function performed before the display of the locked screen to be displayed on a certain part of the locked screen.

According to an embodiment of the present invention, the display module 140 may display at least one virtual button related to the function control in the function-related object.

According to an embodiment of the present invention, the display module 140 may overlay a specific object displayed on the locked screen with the function-related object.

According to an embodiment of the present invention, the control module 160 may change at least one of the size and location of an object displayed on the locked screen, and may display the function-related object on an area not overlapping the object.

According to an embodiment of the present invention, the control module 160 may enable a specific object connected to the function-related object to be displayed on a certain area of the locked screen.

According to an embodiment of the present invention, the control module 160 may enable the function-related object not to be displayed when the specific function is ended, or may change the function-related object for display as an object related to function execution, when the specific function is ended.

Figure 3:
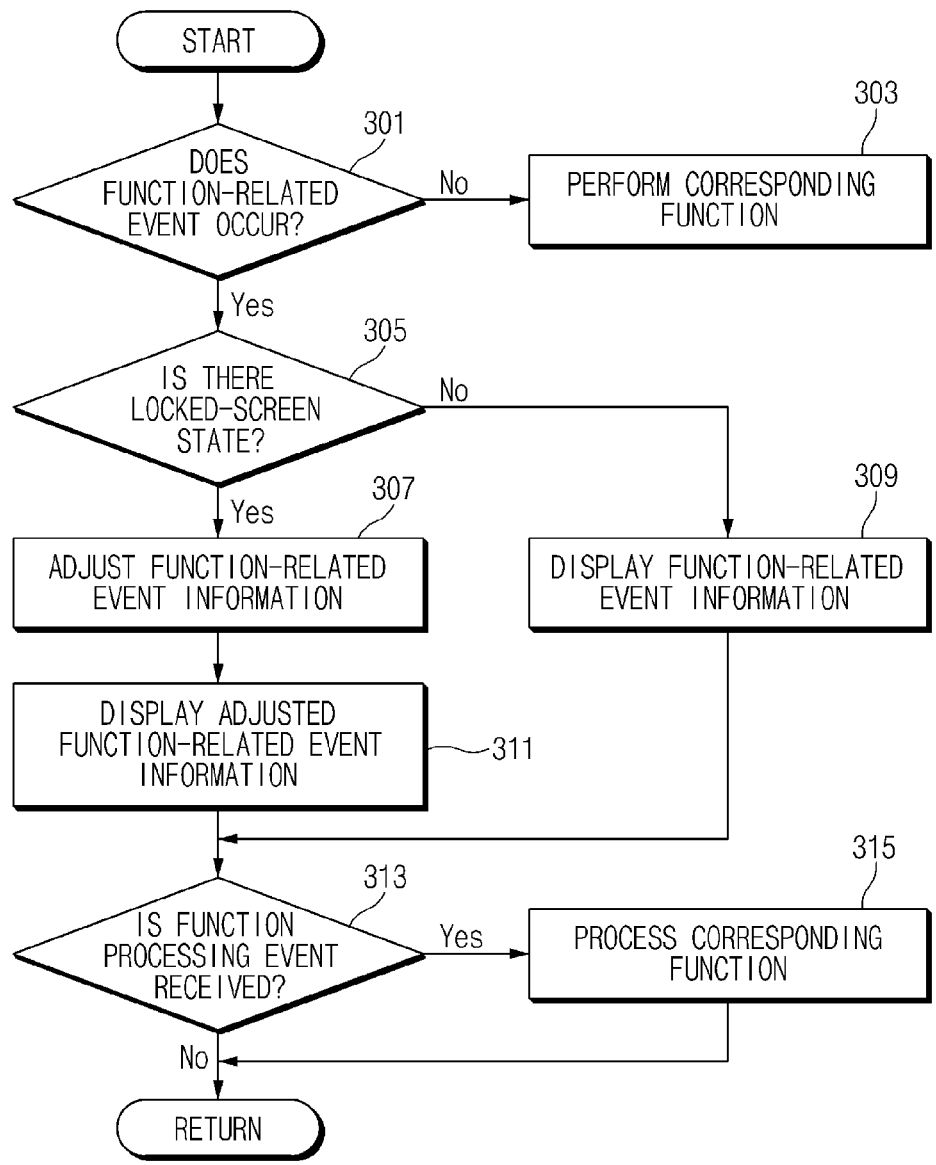
FIG. 3 is a flowchart illustrating a method of operating an electronic device related to screen display, according to an embodiment of the present invention.

FIG. 3 is a flowchart illustrating a method of operating an electronic device related to screen display, according to an embodiment of the present invention.

Referring to FIG. 3, the control module 160 determines whether an event related to a specific function occurs, in step 301. The event may include at least one of a communication function related event (for example, a call connection request or message reception) and an event related to the time set expiration (or termination). When there is no event, the control module 160 maintains a function previously performed, maintains a sleep state, or maintains the turn-off state of the display module 140, in step 303. Alternatively, the control module 160 may unlock a locked screen when an event to unlock the locked screen occurs. When an event related to creating a message or making a call occurs, the control module 160 displays a message creation screen, a phonebook, or a dial screen.

When an event occurs, the control module 160 determines whether there is a locked screen state, in step 305. The locked screen state may correspond to a specified function screen state that is supported by the electronic device 100, for example, a music play screen state or a gallery function activation state.

When it is determined that there is the locked screen state, the control module 160 adjusts at least one of the size and information type of the event information 153 that is stored in the storage module 150, in step 307. Alternatively, the control module 160 may detect event information provided to be displayed on a locked screen. The control module 160 may check the type of an event to adjust the event information 153. For example, the control module 160 may check whether a detected event is a call function-related event, a message function-related event, or a time setting function-related event. The control module 160 may select at least one object included in a locked screen image according to a checked event type. In addition, the control module 160 may replace at least one object selected with adjusted event information. The adjusted event information is displayed, in step 311. Alternatively, the control module 160 may enable adjusted event information to overlap an area where at least one object is arranged, and display the adjusted event information. In the overlapping process, the transparency of the adjusted event information may be regulated. For example, the adjusted event information may be semi-transparently adjusted, and thus, it is also possible to recognize a part of the at least one object.

When it is determined that there is no locked screen state in step 305, the control module 160 displays the event information 153, in step 309. For example, the control module 160 may enable the event information 153 corresponding to a message reception screen or the event information 153 corresponding to a call reception screen to be displayed on the entire screen.

The control module 160 determines whether there a function processing event is received, in step 313. The function processing event may include an event for selecting event information included in the locked screen image 151. The function processing event may also include an event for selecting a function attribute object included in the locked screen image 151. When the function processing event is received, the control module 160 processes a corresponding function, in step 315. For example, when event information related to a call connection function is selected, the control module 160 may perform a call connection or a call rejection according to the type of selected information. Alternatively, the control module 160 may also switch to a message creation screen and message providing screen, according to event information selection. Alternatively, the control module 160 may also switch to a schedule information providing screen or alarm information providing screen. Alternatively, the control module 160 may also stop the ringing of an alarm. The control module 160 may return to a function execution screen pre-defined after the processing of a function, or to a screen provided according to current function processing. Alternatively, the control module 160 may enable a return to the locked screen.

According to an embodiment of the present invention described above, a screen display method may display event information as a component of a specific function screen when displaying the specific function screen according to event reception. Also, it is possible to display the event information on a specific screen according to the type of a function screen being executed or a function screen executed before a sleep state. For example, when a call connection request message is received, the electronic device 100 may display event information corresponding to the call connection request message on a corresponding function screen (a locked screen, a home screen, or a standby screen) or on the entire screen, according to the type of function screen.

According to various embodiments of the present invention, the screen display method may further include one or more of the processes described above with respect to FIG. 2.

Figure 4:
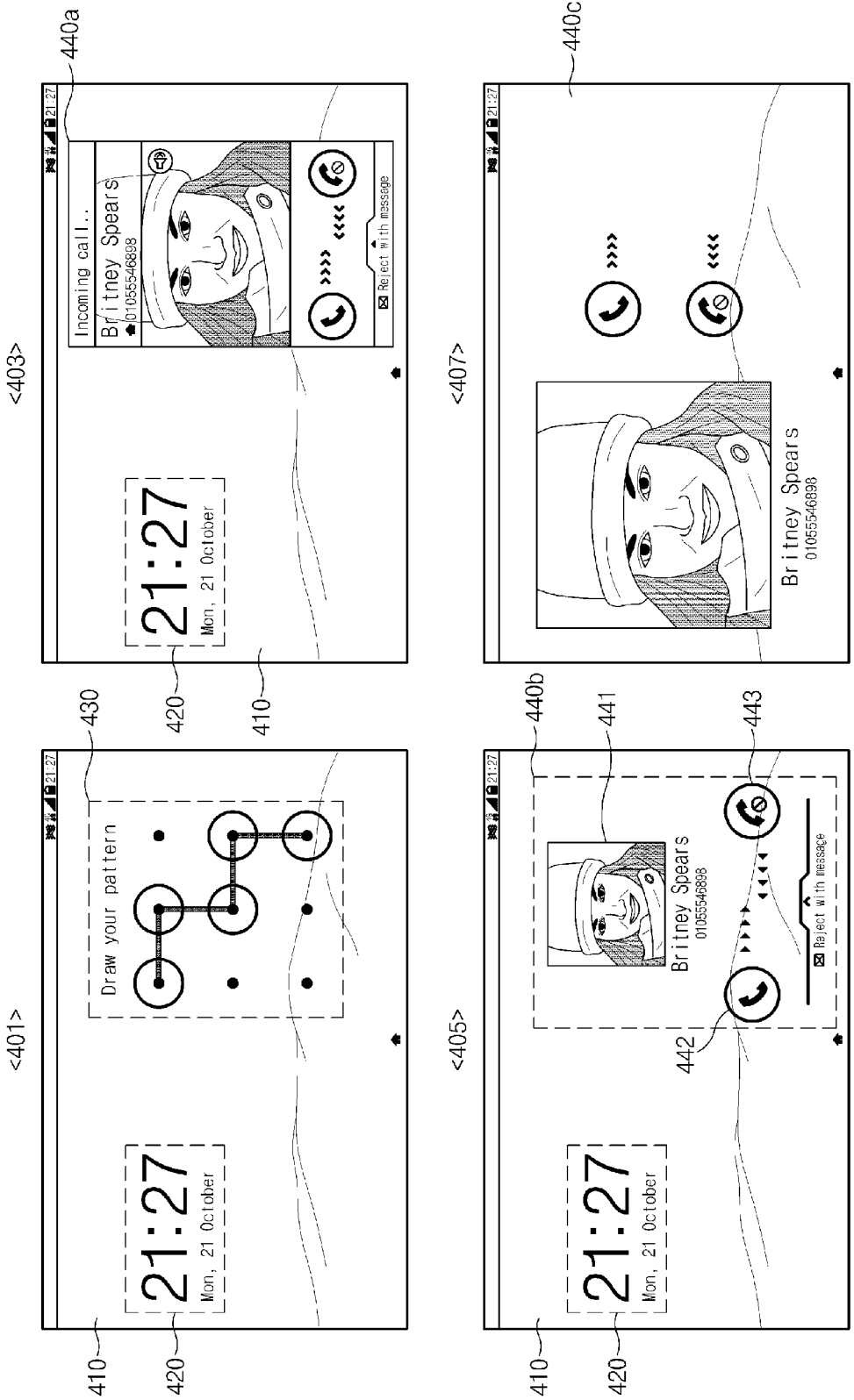
FIG. 4 is a diagram illustrating screens related to a call function related event, according to an embodiment of the present invention.

FIG. 4 is a diagram illustrating screens related to a call function related event, according to an embodiment of the present invention.

Referring to FIG. 4, the display module 140 of the present invention may display a locked screen image in response to a locked screen state switch request as shown in screen 401. The locked screen image displays a background image 410, a time object 420, and a pattern lock object 430. The objects configuring the locked screen image may be arbitrarily adjusted according to a user setting or a designer intention. The background image 410 and the time object 420 may be information attribute objects displaying information. The pattern lock object 430 may be a function attribute object that receives a user input and unlocks a locked screen state according to the user input. When a specified pattern is input through the pattern lock object 430, the display module 140 may display a screen according to the unlocking of the locked screen state. For example, the display module 140 may display a function screen, a standby screen, or an icon screen provided directly before a transition to the locked screen state.

While a locked screen is displayed or in a sleep state, a call connection request message may be received. The control module 160 displays call function related information 440a on the background image 410, according to the reception of the call connection request message, as shown in screen 403. The call function related event information 440a may be information that is obtained by adjusting the size of call function related event information stored in the storage module 150. The control module 160 may select an object to be replaced from the locked screen represented on the screen 401 when the call connection request message is received. For example, the control module 160 may select the pattern lock object 430 by default according to a specified routine. The control module 160 may check the size of the pattern lock object 430. The control module 160 may adjust the size of the call function related event information so that the size corresponds to the pattern lock object 430, and thus, may generate the call function related event information 440a. The control module 160 may replace or overlay the pattern lock object 430 with the call function related event information 440a to display the event information.

According to an embodiment of the present invention, the control module 160 may select a function attribute object, excluding an information attribute object among objects included in a locked screen. The control module 160 may select the pattern lock object 430 that is a function attribute object occupying a relatively wide area, when there is a plurality of function attribute objects. Alternatively, the control module 160 may select the pattern lock object 430 according to the type of an event that has occurred, among a plurality of function attribute objects. According to an embodiment of the present invention, a locked screen may include a shortcut icon object and a pattern lock object as a function attribute object. According to the characteristic of a call connection request, the control module 160 may maintain the display state of the shortcut icon object and select the pattern lock object 430 as an object to be replaced.

According to an embodiment of the present invention, when a call connection request message is received while a locked screen is displayed or in a sleep state, the control module 160 displays call function related event information 440b, according to the reception of a call connection request message, as shown in screen 405. The control module 160 may select an object to be displayed on the pattern lock object, among at least one object configuring call function related event information. For example, the control module 160 extracts a call connection object 442, a call rejection object 443, and a call related information object 441 from the call function related event information, and generates the call function related event information 440b. The control module 160 may adjust the size and arrangement of the extracted call connection object 442, the extracted call rejection object 443, and the extracted call related information object 441 to an area on which the pattern lock object 430 is arranged, and thus, generate the call function related event information 440b. The control module 160 may replace or overlay the pattern lock object 430 with the call function related event information 440b to display the event information.

In screen 401, when a specified input occurs on the pattern lock object 430, the control module 160 may unlock the locked screen. When a call connection request message is received while the locked screen is unlocked, the control module 160 displays call function related event information 440c on the entire screen, as shown in screen 407. The call function related event information 440c may be information that is obtained by not separately adjusting the size, color, and shape of call function related event information stored in the storage module 150.

According to an embodiment of the present invention described above, the electronic device 100 may display event information corresponding to the current display state of the display module 140 of the electronic device 100, while displaying event information according to specific event occurrence. Accordingly, the electronic device 100 may provide a natural information display condition according to the screen display state of the electronic device 100. Therefore, it is possible to minimize user confusion about information recognition that may occur due to a rapid change in information display state, and to represent appropriate information suitable for the situation of each electronic device 100.

FIG. 5 is a diagram illustrating reception and processing of a time function related event, according to an embodiment of the present invention.

Referring to FIG. 5, the display module 140 of the present invention may display a locked screen according to a locked screen state switch, as shown in screen 501. The locked screen includes a background image 510, a time object 520, and a pattern lock object 530. The background image 510 may be an image different from the background image 410. The background image 510 may also be changed to the background image 410 according to a user setting. The time object 520 and the pattern lock object 530 may have similar functions to the time object 420 and the pattern lock object 430, as described in FIG. 4.

According to an embodiment of the present invention, the control module 160 may check a time setting related to a specified alarm. When a time preset by a specified time function, such as a wake-up call function, is expired, the control module 160 may enable wake-up call function related event information 540 to be displayed on the display module 140, as shown in screen 503. The control module 160 may adjust the size of wake-up call function related event information stored in the storage module 150 so that the size corresponds to an area on which the pattern lock object 530 is arranged, and thus, may generate the wake-up call function related event information 540.

According to an embodiment of the present invention, the control module 160 may also adjust the color of wake-up call function related event information stored in the storage module 150 so that the color is associated with the background image 510, and thus, may generate the wake-up call function related event information 540. For example, the original of the wake-up call function related event information stored in the storage module 150 may be red, and the color of the background image 510 on which the pattern lock object 530 is arranged may be blue. The control module 160 may adjust the color of the wake-up call function related event information 540 to blue or a color similar thereto. Alternatively, the control module 160 may adjust a plurality of objects configuring the wake-up call function related event information 540 so that the objects have different blue-based colors. For example, among the wake-up call function related event information 540, the control module 160 may adjust an alarm clock object, having a clock shape, to dark blue and an alarm end object, related to a touch input for ending an alarm, to sky-blue.

According to an embodiment of the present invention, the control module 160 may check a time setting related to a specified schedule. When a specified schedule time is expired, the control module 160 may enable schedule function related event information 550 to be displayed on the display module 140, as shown in screen 505. In this process, the control module 160 may check the minimum size of schedule function related event information stored in the storage module 150. The adjustable minimum size of the schedule function related event information may be larger than that of any object that is included in a locked screen. The control module 160 may select objects so that the number of objects to be removed is minimal, when displaying the schedule function related event information 550. The control module 160 may remove a plurality of objects from a locked screen and then display schedule function related event information 550 on an area secured by the removing of the objects. According to an embodiment of the present invention, the control module 160 may perform selection to select a plurality of function attribute objects included in a locked screen and thus secure an area to display the schedule function related event information 550. The control module 160 may re-arrange the locations of information attribute objects. Alternatively, the control module 160 may select objects to be removed to minimize the re-arrangement of remaining objects when the schedule function related event information 550 is displayed on the locked screen. In this example, the object to be removed may be an object that has an area of which at least a part overlaps the display area of the schedule function related event information 550.

In screen 505 the pattern lock object 530 is removed and the schedule function related event information 550 is displayed on an area wider than a corresponding area. When a separate object is arranged between the time object 520 and the pattern lock object 530, and a corresponding object overlaps the schedule function related event information 550 in the process of displaying the event information, the separate object may be removed.

FIG. 6 is a diagram illustrating the independent display of event information, according to an embodiment of the present invention.

Referring to FIG. 6, the display module 140 displays a locked screen that includes a background image 610, a time object 620, and a short-cut icon object 630 as shown in screen 601. The short-cut icon object 630 may include a plurality of icon objects.

According to an embodiment of the present invention, the control module 160 may control the display of text function related event information 640 corresponding to the reception of a text message when the reception of the text message occurs. The control module 160 may determine an area on the locked screen to display the text function related event information 640. When there is an area to display the text function related event information 640 on the background image 610, the control module 160 enables the text function related event information 640 to be displayed, as shown in screen 603. Accordingly, the display module 140 may display the text function related event information 640 without removing the short-cut icon object 630. When the text function related event information 640 is selected, the control module 160 may enable a text providing screen to be displayed on the display module 140. In this case, the text providing screen may be displayed on the entire screen.

According to an embodiment of the present invention, the control module 160 may control the display of SNS function related event information 650, corresponding to the reception of an SNS message, when the reception of the SNS message occurs. In this case, when an area to display the SNS function related event information 650 is seen on a locked screen, the control module 160 may display the SNS function related event information 650 along with the time object 620 and the short-cut icon object 630, as shown in screen 605.

Figure 7:
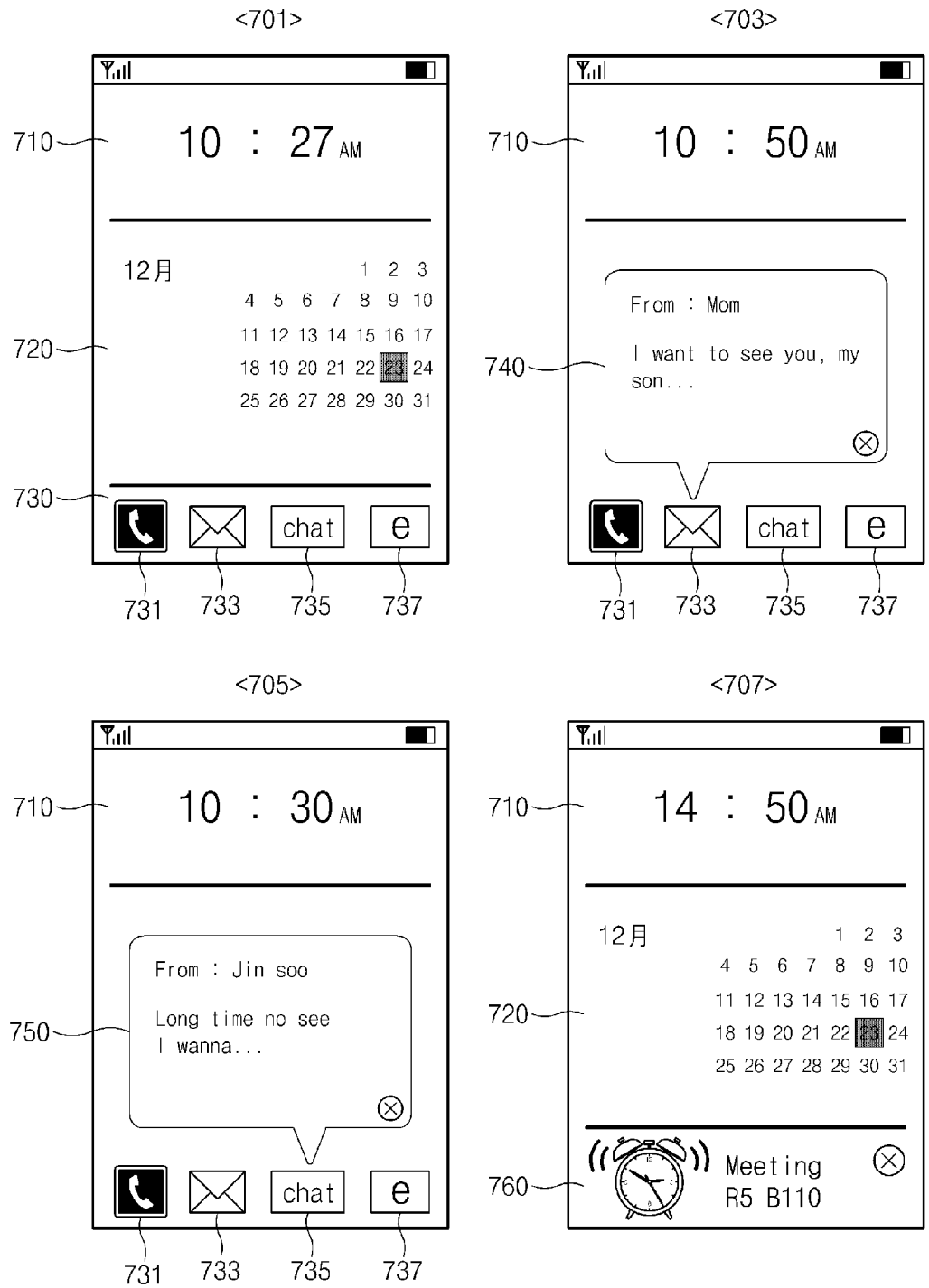
FIG. 7 is a diagram illustrating associated display of function related event information, according to an embodiment of the present invention.

FIG. 7 is a diagram illustrating the associated display of event information, according to an embodiment of the present invention.

Referring to FIG. 7, the display module 140 display a standby screen including a time object 710, a calendar object 720, and a short-cut icon object 730 as shown in screen 701. The standby screen may also be a specific function screen, such as a locked screen. The short-cut icon object 730 includes a call icon object 731, a message icon object 733, a chatting icon object 735, and a web icon object 737. At least one object of the short-cut icon object 730 may vary according to a user setting. Also, any of the objects of the short-cut icon object 730 may be removed, or a new icon object may be added thereto.

According to an embodiment of the present invention, when a text function related event related to a message reception function occurs, the control module 160 enables text function related event information 740 to be displayed on an area on which the calendar object is arranged, as shown screen 703. The control module 160 may generate the text function related event information 740 so that the event information has an image shape associated with a message icon object 733 arranged on the short-cut icon object 730. In addition, the control module 160 may arrange the text function related event information 740 so that the event information is adjacent to an area on which the message icon object 733 is arranged. When a selection event for viewing the text function related event information 740 occurs, the control module 160 may enable a text providing screen to be displayed on the entire screen of the display module 140. The control module 160 may also unlock a locked screen. When an event for removing the text function related event information 740 occurs, the control module 160 may remove the text function related event information 740 from the display module 140 and return to the screen 701.

According to an embodiment of the present invention, when a chatting function related event related to a chatting message reception function occurs, the control module 160 enables chatting function related event information 750 to be displayed on an area on which the calendar object 720 is displayed, as shown in screen 705. The control module 160 may generate the chatting function related event information 750 so that the event information has an image shape associated with the chatting message icon object 735 arranged on the short-cut icon object 730. In addition, the control module 160 may arrange the chatting function related event information 750 so that the event information is adjacent to an area on which the chatting icon object 735 is arranged. When a selection event for viewing the chatting function related event information 750 occurs, the control module 160 may enable a chatting function execution screen to be displayed on the entire screen of the display module 140. The control module 160 may also unlock a locked screen. When an event for removing the chatting function related event information 750 occurs, the control module 160 may return to the screen 701.

According to an embodiment of the present invention, when a specified time set is expired and a corresponding alarm function related event occurs, the control module 160 controls the display of alarm function related event information 760, as shown in screen 707. The control module 160 determines the presence of the calendar object 720 as an object related to an alarm function. The control module 160 may maintain the calendar object 720 and remove the time object 710 or the short-cut icon object 730. In screen 707, the short-cut icon object 730 is removed and the alarm function related event information 760 is displayed on a corresponding area. According to an embodiment of the present invention, the alarm function related event may be relevant to the time object 710. In this case, the control module 160 may also enable the alarm function related event information 760 to be displayed on an area on which the calendar object 720 is displayed.

An alarm function related object may be predefined according to a user setting or the usage history of the electronic device 100. For example, when there is a history that a calendar application has been executed a certain number of times or more after the performing of an alarm function, the control module 160 may automatically map a calendar object to an alarm function related object. Also, when there is a history that schedule application or scheduler execution has occurred a certain number of times or more after the performing of the alarm function, the control module 160 may automatically map a schedule application or scheduler related object to an alarm function related object. When there is no alarm function related object on a locked screen, the control module 160 may remove an object defined by default, an object randomly selected, or a specific object selected according to the attribute of an object, and display the alarm function related event information 760.

Figure 8:
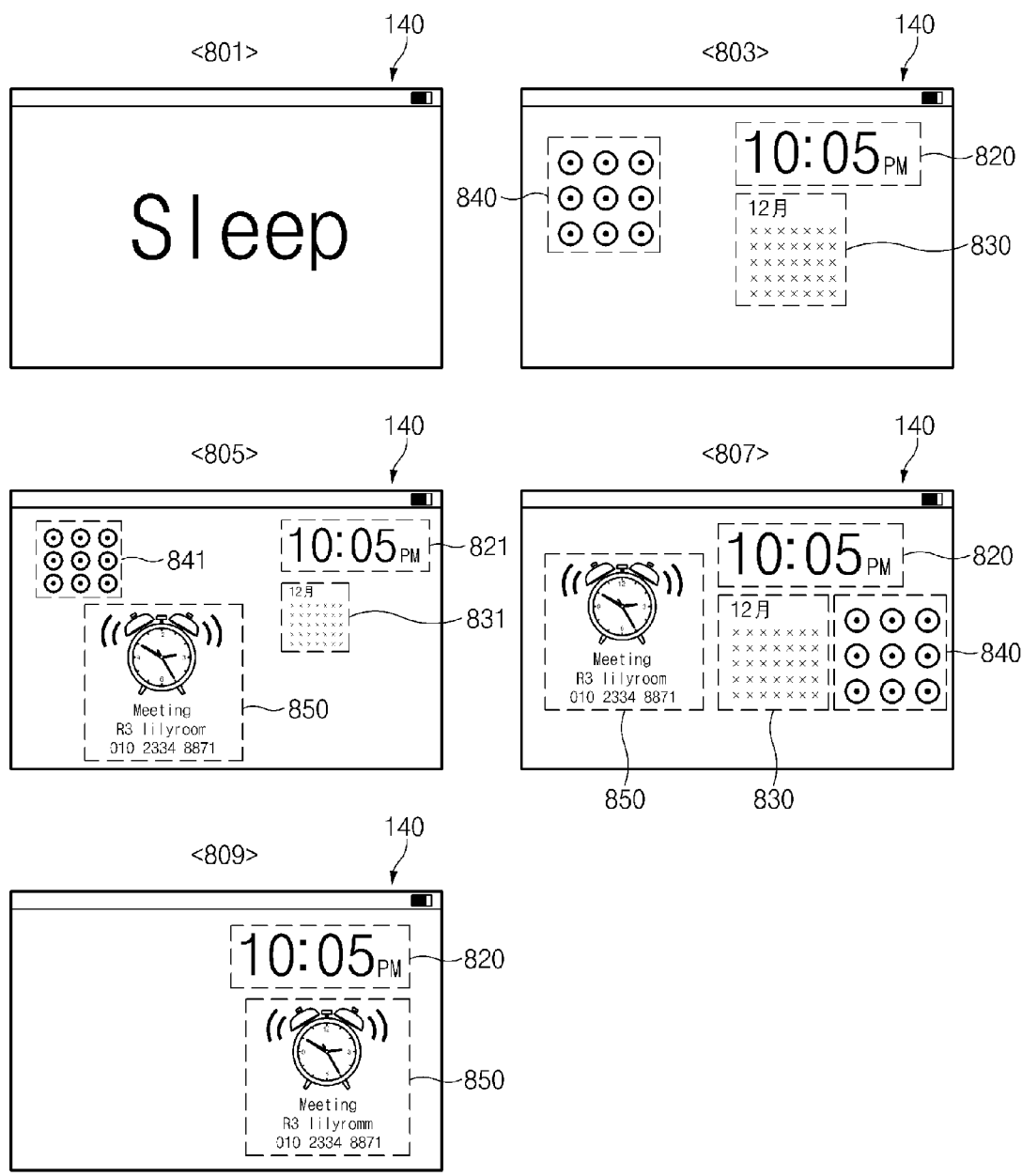
FIG. 8 is a diagram illustrating various display manners of event information, according to an embodiment of the present invention.

FIG. 8 is a diagram illustrating various display types of event information, according to an embodiment of the present invention.

Referring to FIG. 8, when the electronic device 100 is in a sleep state or deep sleep state, the display module 140 may be in a turn-off state as shown in screen 801. Alternatively, as shown in screen 803, the electronic device 100 may be displaying a locked screen. According to an embodiment of the present invention, the locked screen of screen 803 includes a pattern lock object 840, a time object 820, and a calendar object 830.

When a schedule function related event occurs in a sleep state or a locked-screen display state, the control module 160 may check a specified type of schedule function related event information 850. According to an embodiment of the present invention, the control module 160 may adjust the size of at least one object in order to secure a certain area, as shown in screen 805. For example, the display module 140 may display size-adjusted objects 821, 831, and 841. In addition, the control module may display the schedule function related event information 850 on a certain area secured by the size-adjusted objects 821, 831 and 841.

According to an embodiment of the present invention, the control module 160 may check at least one of the location and size of objects 820, 830, and 840 arranged on a locked screen to display the schedule function related event information 850. In this process, the control module 160 may detect a certain area to display the schedule function related event information 850. The control module 160 may adjust the location of at least one of the objects 820, 830 and 840, such as the pattern lock object 840, to secure a certain area as shown in screen 807. When a certain area is secured by the re-arrangement of the pattern lock object 840, the control module 160 may display the schedule function related event information 850 on the certain area. Referring to screen 807, the control module 160 may arrange the schedule function related event information 850 on a location at which the pattern lock object 840 was previously located.

According to an embodiment of the present invention, the control module 160 may remove remaining objects 830 and 840, excluding the time object 820 associated with the schedule function related event information 850, as shown in screen 809. The control module 160 may enable the schedule function related event information 850 to be displayed on an area adjacent to the time object 820.

The schedule function related event information 850 may be information that is previously designed to be displayed according to schedule function related event occurrence. Alternatively, the schedule function related event information 850 may be information obtained by adjusting the schedule function related event information stored in the storage module 150, according to a specified rule (a size and shape to be provided on a locked screen). According to an embodiment of the present invention, the storage module 150 may store a rule on event information to be displayed on each function screen. Alternatively, the storage module 150 may include the schedule function related event information to be displayed on each function screen. For example, the storage module 150 may include schedule function related event information to be displayed on a locked screen, schedule function related event information to be displayed on a home screen, and schedule function related event information to be displayed on a specific app execution screen. Pieces of schedule function related event information stored in the storage module 150 may be different from or the same as one another in at least one of size, shape, and color. When event information suitable for each function screen is stored in the storage module 150, the control module 160 may detect event information to be displayed on a corresponding function screen without any adjustment.

According to an embodiment of the present invention, in the process of displaying event information, the control module 160 may also adjust the size of event information depending on the situation (the arrangement, number, or size of objects on a corresponding function screen).

Figure 9:
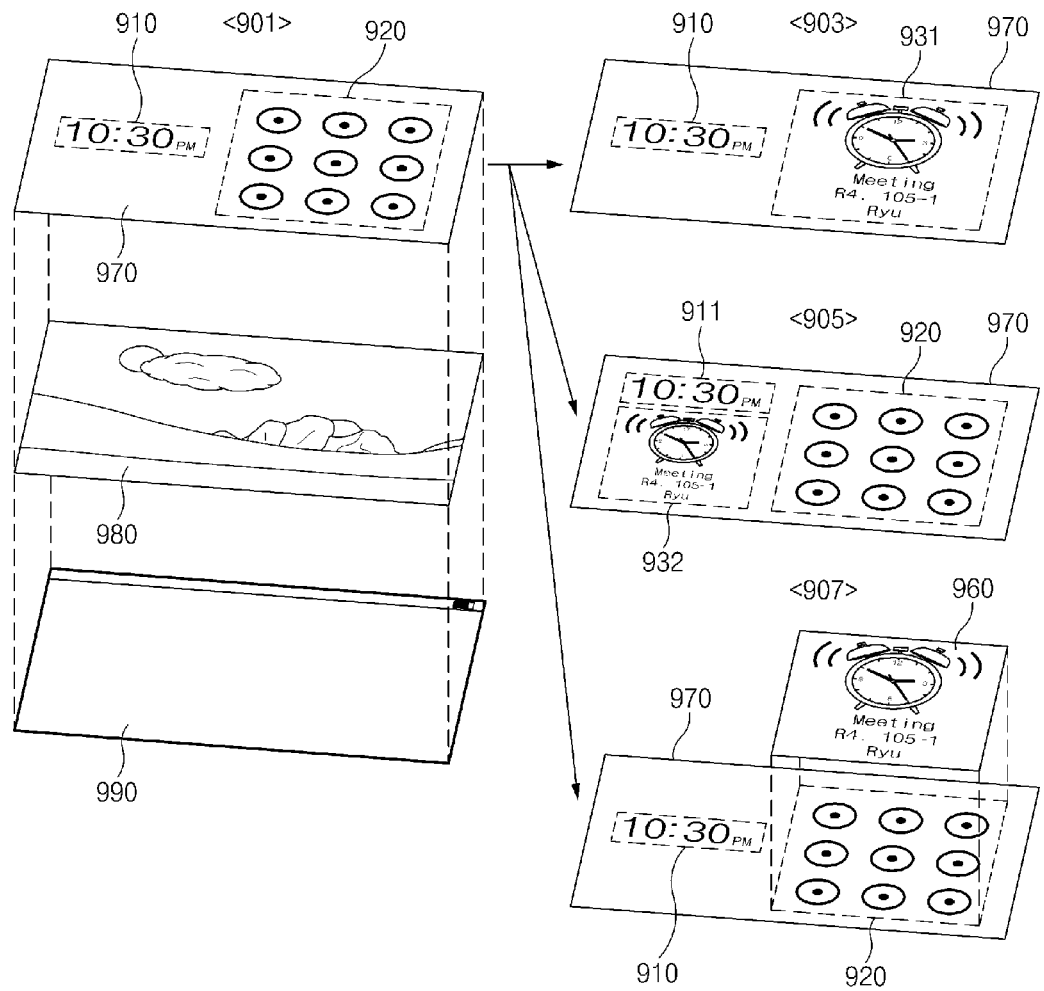
FIG. 9 is a diagram illustrating the display of event information in a layered manner, according to an embodiment of the present invention.

FIG. 9 is a diagram illustrating how to display event information in a layered manner, according to an embodiment of the present invention.

Referring to FIG. 9, the display module 140 displays a locked screen on which a first layer 990 having a fundamental area, a second layer 980 having a background image, and a third layer 970 having objects 910 and 920, are arranged in a layered manner as shown in screen 901. The first layer 990 may include an area on which only an indicator is arranged. When a specific event such as a schedule function related event occurs, the control module 160 may check at least one of the location and size of the objects 910 and 920 and schedule function related event information to be displayed on the display module 140.

According to an embodiment of the present invention, the control module may remove a pattern lock object 920 having an area similar or equal to the size of specified schedule function related event information, among the objects 910 and 920 arranged on the third layer 970, as shown in screen 903. The control module 160 enables schedule function related event information 931 to be displayed on the third layer 970 in an area where the pattern lock object 920 had been arranged.

According to an embodiment of the present invention, the control module 160 may re-arrange objects on the third layer 970 and arrange the schedule function related event information 931 in a certain area, as shown in screen 905. For example, in the re-arrangement of the objects, the control module 160 may change the location of the time object 910 in consideration of the arrangement of the schedule function related event information 931. Accordingly, the time object 911 may be arranged at a certain location of the third layer 970. It is possible to arrange the schedule function related event information 931 in a certain area secured by the location-changed time object 911. In this case, the control module 160 may display size adjusted function related event information 932 to be suitable for the area secured.

According to an embodiment of the present invention, the size adjustment range of event information to be displayed on a specific function screen may be limited. Accordingly, the control module 160 may compare the size of an area secured by re-arranging the objects 910 and 920 (the size of an area excluding an area occupied by the objects 910 and 920) with an adjustable size of the schedule function related event information 931. The control module 160 may determine whether the adjustable size of the schedule function related event information 931 corresponds to the size of a secured area. Alternatively, the control module 160 may determine whether the adjusted sizes of the schedule function related event information 931 includes a size applied to the size of a secured area.

According to an embodiment of the present invention, the control module 160 may adjust the size of the schedule function related event information 932 and display the event information, as shown screen 905, when the size of a secured area may be applied after the size adjustment of the schedule function related event information 931. According to an embodiment of the present invention, when the size of the schedule function related event information 932 is larger that of the secured area even after the size adjustment, the control module 160 may remove at least one object, as shown in screen 903, or overlay at least one object with the schedule function related event information.

In screen 907, the control module 160 may overlay the schedule function related event information with a separate fourth layer 960 on the pattern lock object 920 of the third layer 970 on which the objects 910 and 920 are arranged. Accordingly, the schedule function related event information may be arranged on a new layer.

Although FIG. 9 illustrates that the display module 140 configures layers in such a way that the locked-screen layer 990 is separated from the background layer 980, the embodiments of the present invention are not limited thereto. For example, the display module 140 may also display a screen in such a way that the background layer 980 is included in the locked-screen layer 990. Accordingly, in screen 901, the electronic device 100 may also display a screen in such a way that the background layer 980 is removed and a background image is applied to the locked-screen layer 990. Alternatively, the electronic device 100 may also display a screen so that the layer 970 has the same image as a background image applied to the background layer 980.

Figure 10:
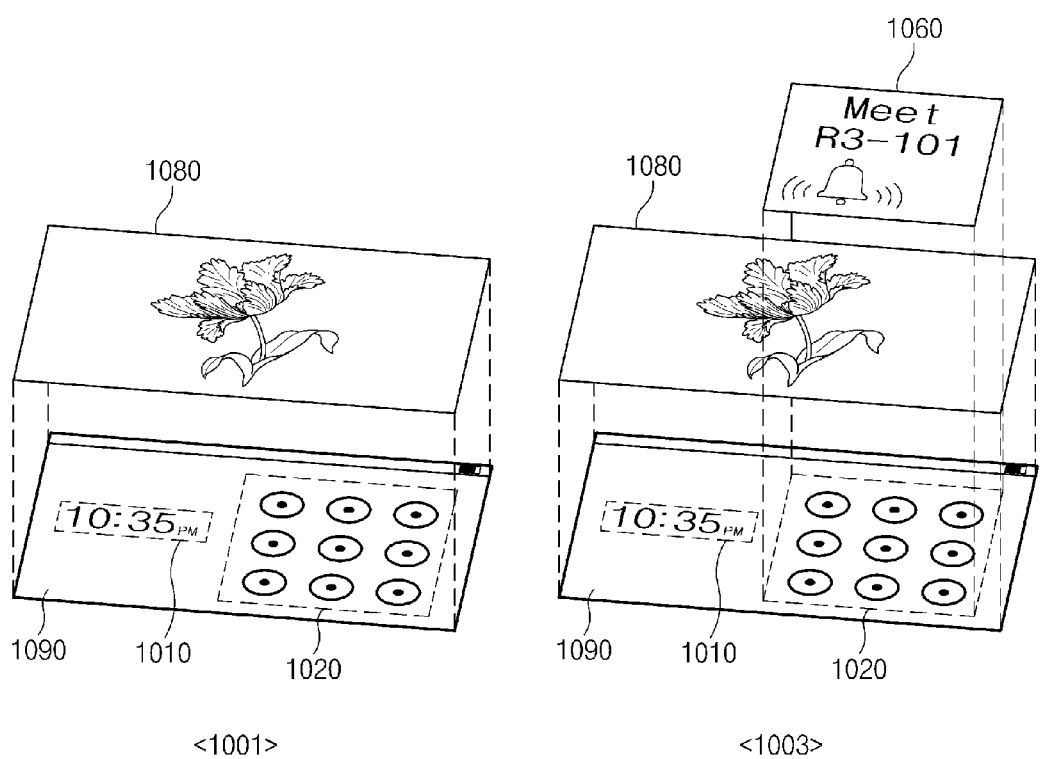
FIG. 10 is a diagram illustrating the display of event information in a layered manner, according to another embodiment of the present invention.

FIG. 10 is a diagram illustrating the displaying of event information in a layered manner, according to another embodiment of the present invention.

Referring to FIG. 10, the electronic device 100 includes a specific function screen, such as a locked-screen layer 1090 corresponding to a locked screen, and a background layer 1080 including a background image as shown in screen 1001. The locked-screen layer 1090 includes a time object 1010 and a pattern lock object 1020.

When a specific event occurs, the control module 160 may overlay the locked-screen layer 1090 with the background layer 1080, and display an event information layer 1060, including event information corresponding to specific event occurrence, on the background layer 1080, as shown in screen 1003. The control module 160 may display the event information layer 1060 on the background layer 1080 and enable the event information layer to be aligned with a specific object area, such as the pattern lock object 1020, which is arranged on the locked-screen layer 1090. In this example, the size of the event information layer 1060 may correspond to the size of the pattern lock object 1020.

According to an embodiment of the present invention, the control module 160 may also include the event information in the background layer 1080. For example, the control module 160 may not separately provide the event information layer 1060, but may include and display event information in the background layer 1080. The location of event information partially arranged in the background layer 1080 may be aligned with a specific object of a locked screen, such as the pattern lock object 1020.

According to an embodiment of the present invention, the control module 160 may select objects to be maintained on and be hidden from the locked-screen layer 1090, according to the attribute of an object arranged on the locked screen. The control module 160 may enable the object to be hidden to be overlaid with the event information layer 1060.

While event information display is described based on a locked screen for the convenience of description, the embodiments of the present invention are not limited thereto. That is, as mentioned previously, a locked screen or a specific function screen may be displayed, depending on event occurrence in a turn-off state of the display module 140, such as a sleep state. In this case, a locked screen to which event information is applied or a specific function screen to which event information is applied may be displayed. Also, a function screen displaying event information may also be an app execution screen according to music play app execution, a scheduler app execution screen according to scheduling app execution, a video play app execution screen, a message creation screen, or a file editing screen, in addition to a locked screen. Thus, the function of processing event information described in various embodiments of the present invention may include the function of determining whether to adjust or maintain the display type or location of event information depending on the state of the electronic device 100, and displaying a function screen to which corresponding event information is applied.

Although it is described above that the original event information is stored in the storage module 150 and that, in a display process, at least one of the shape, color and size of the event information is adjusted and displayed, such an information display function may be adjusted. For example, the control module 160 may also directly perform a drawing operation to be suitable for the object area of a locked screen or a specific function screen whenever the event information is displayed.

Figure 11:
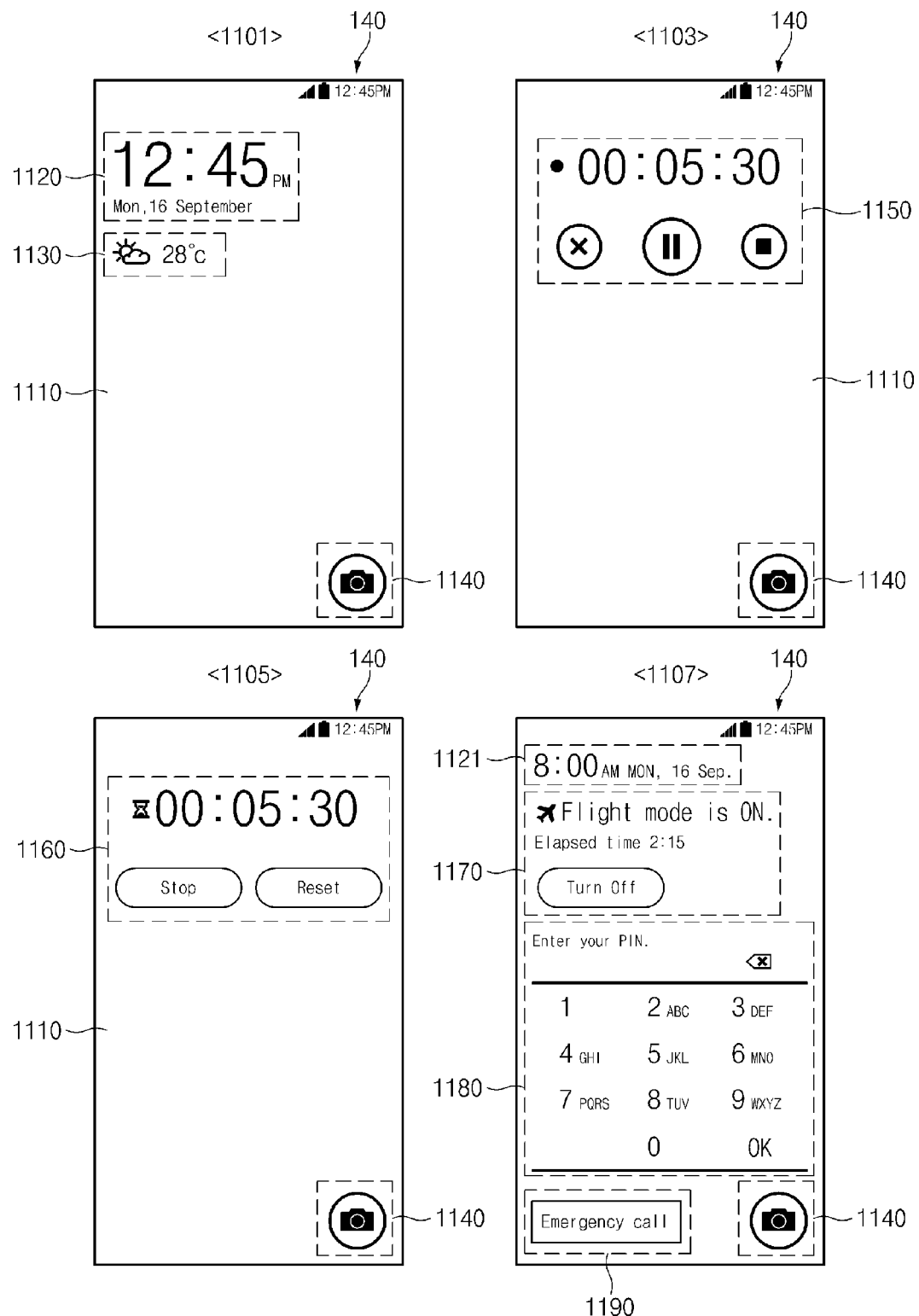
FIG. 11 is a diagram illustrating function related event processing, according to an embodiment of the present invention.

FIG. 11 is a diagram illustrating function related event processing, according to an embodiment of the present invention.

Referring to FIG. 11, the display module 140 displays a locked screen as shown in screen 1101. The locked screen includes a background image 1110, a time object 1120, and a weather object 1130. At least one object and a background image of the locked screen may be deleted or replaced with another object according to a setting change. Also, the locked screen may further include another object according to a setting change. For example, a camera object 1140 may be arranged on a certain location of the locked screen.

According to an embodiment of the present invention, the display module 140 displays a recording function object 1150 in a locked-screen state, as shown in screen 1103. The recording function object 1150 may be displayed when a recording function is activated. The recording function may be performed through background processing. The recording function object 1150 may be arranged on areas of the locked-screen where the time object 1120 and the weather object 1130 are displayed, according to the control of the control module 160. Accordingly, the display module 140 may display the recording function object 1150 and the camera object 1140 on the background image 1110.

According to an embodiment of the present invention, the display module 140 displays a timer function object 1160, as shown in screen 1105. The control module 160 may enable a timer function to be performed through background processing. The timer function object 1160 may be arranged on areas of the locked-screen where the time object 1120 and the weather object 1130 are displayed. Accordingly, the display module 140 may display the timer function object 1160 and the camera object 1140.

According to an embodiment of the present invention, the display module 140 displays an airplane mode object 1170 on a certain area of the locked screen, as shown in screen 1107. The control module 160 may enable the airplane mode object 1170 to be included in the locked screen, when the electronic device is in an airplane mode and enters the locked screen. At least one of the shape and size of the time object 1120 may be changed. The display module 140 may display a changed time object 1121 in a certain area. The locked screen may overlay the weather object 1130 with the airplane mode object 1170. The airplane mode object 1170 may be adjusted in transparency. Accordingly, only the airplane mode object 1170 may be displayed on a corresponding display module 140. According to an embodiment of the present invention, the display module 140 may further include a number lock object 1180, an emergency call object 1190, and the camera object 1140. The number lock object 1180, the emergency call object 1190, and the camera object 1140 may be objects added according to a locked-screen setting. According to an embodiment of the present invention, at least one of the number lock object 1180 and the emergency call object 1190 may be connected to the airplane mode object 1170. According to the airplane mode setting, when the airplane mode object 1170 is displayed on the locked screen, the number lock object 1180 and the emergency call object 1190 may be automatically displayed. When an airplane mode is inactivated, the control module 160 may automatically remove, from the locked screen, at least one of the number lock object 1180 and the emergency call object 1190 connected to the airplane mode object 1170.

As described above, the electronic device 100 may display an object for a recording function, a timer function, or an airplane mode function on the locked screen. Accordingly, the electronic device 100 of the present invention enables a recording function, a timer function, and an airplane mode ON/OFF function to be used intuitively in a locked-screen state by using the recording function object 1150, the timer function object 1160, and the airplane mode object 1170.

Figure 12:
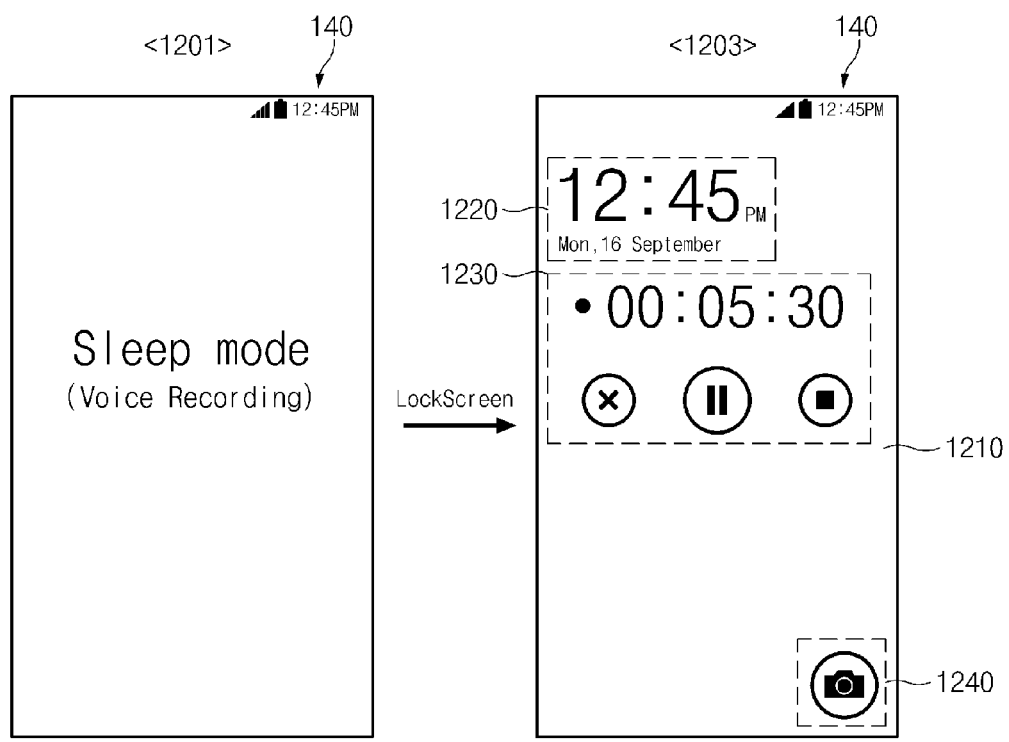
FIG. 12 is a diagram illustrating recording-function related event processing, according to an embodiment of the present invention.

FIG. 12 is a diagram illustrating recording-function related event processing, according to an embodiment of the present invention.

Referring to FIG. 12, the display module 140 has a sleep mode state as shown in screen 1201. For example, the display module 140 may be in a turn-off state, and the control module 160 may be in a power-supplied state. According to an embodiment of the present invention, the control module 160 may be in a state in which a recording function is activated through background processing. The electronic device 100 may receive an event related to recording function activation before the entrance into a sleep mode. The control module 160 may activate a recording function according to corresponding event processing. In addition, when an event requesting entrance into the sleep mode occurs, the control module 160 may enable the electronic device 100 to be transited to a sleep mode state, as shown in screen 1201.

According to a locked-screen switch request event, the control module 160 may control a switch from a sleep mode state to a locked-screen state, as shown in screen 1203. The display module 140 may display a locked screen according to a locked-screen switch. The locked screen displays a time object 1220 and a recording function object 1230 on a background image 1210. According to an embodiment of the present invention, the display module 140 may display a camera object 1240 according to a locked-screen setting.

The recording function object 1230 may include recording elapse time information, a virtual button for cancelling recording, a virtual button for pausing the recording, and a virtual button for stopping recording. By selecting each virtual button, it is possible to continue to record or stop recording.

Figure 13:
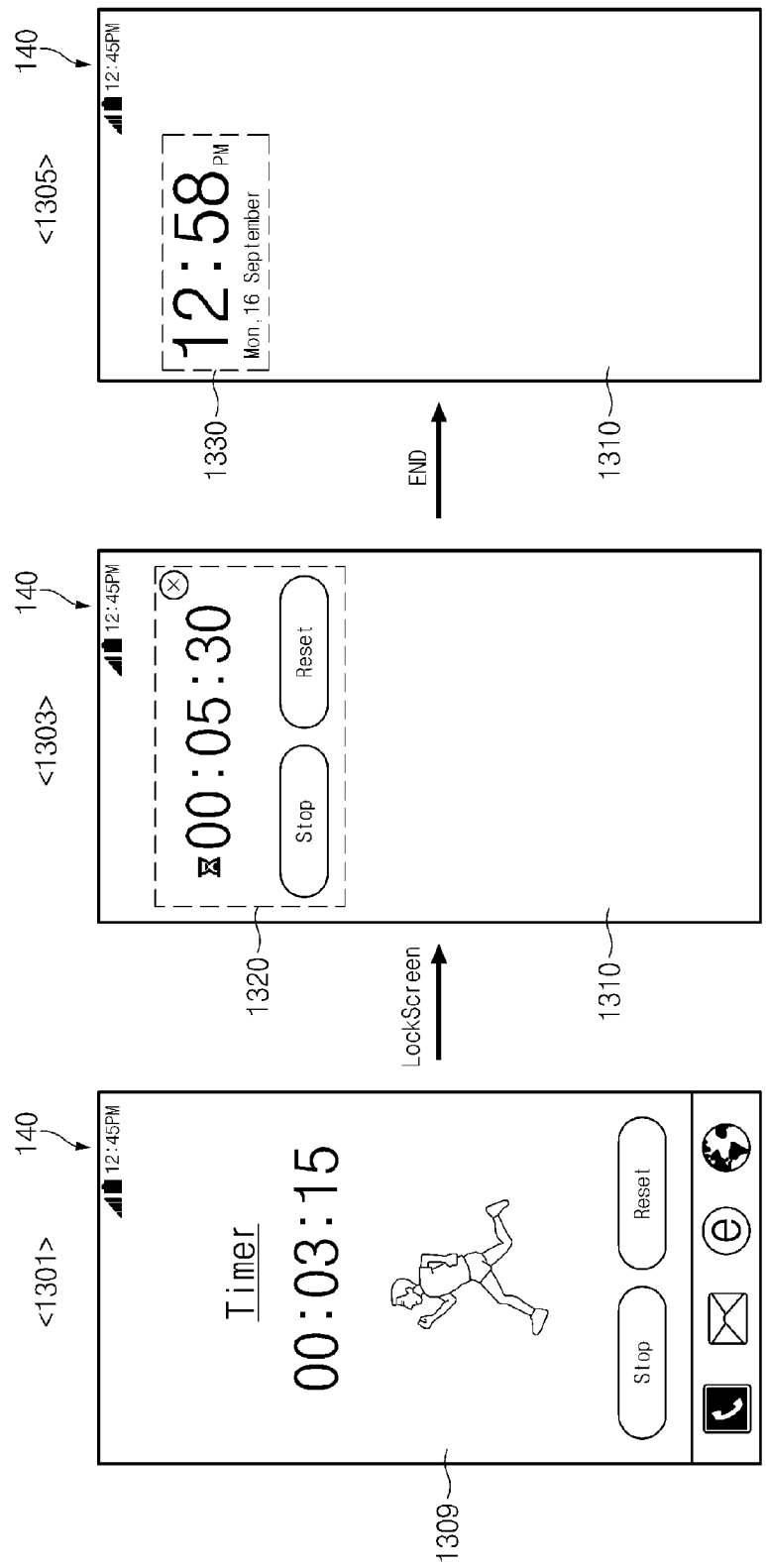
FIG. 13 is a diagram illustrating timer-function related event processing, according to an embodiment of the present invention.

FIG. 13 is a diagram illustrating timer-function related event processing, according to an embodiment of the present invention.

Referring to FIG. 13, the display module 140 displays a screen according to timer function execution as shown in screen 1301. The control module 160 may provide an icon or a menu item related to timer function activation. When an event related to the timer function activation occurs, the control module 160 may activate a timer function and display a related screen 1309 on the display module 140.

While the timer function is performed, the control module 160 may receive a locked-screen switch request event. For example, the control module 160 may receive a sleep mode entrance event and a sleep mode inactivation event as the locked-screen switch request event. Alternatively, the control module 160 may receive a specific key event, touch event or gesture event that requests for locked-screen execution.

The control module 160 enables a locked screen to be displayed on the display module 140, as shown in screen 1303, when the locked-screen switch request event is received. The display module 140 displays a timer function object 1320 on a certain area of the locked screen. The timer function object 1320 may be an object related to a timer function that operates through background processing. The timer function object 1320 may include a virtual button for initiating a timer, a virtual button for resetting a timer, and timer elapse information. Also, the timer function object 1320 may include a virtual button related to a function end. A user may perform the control of a timer function on a locked screen by using the above-described virtual buttons.

According to an embodiment of the present invention, the timer function object 1320 may overlap a time object 1330. According to the transparency of the timer function object 1320, the time object 1330 arranged on a lower layer may not be displayed and only the timer function object 1320 may be displayed on a background image 1310.

According to an embodiment of the present invention, when an event related to a timer function end occurs, the control module 160 may remove the timer function object 1320 from the locked screen. The control module 160 may end a timer function related to the timer function object 1320. The display module 140 may display the time object 1330, as shown in screen 1305, according to the timer function end. By removing the timer function object 1320 arranged on the time object 1330, the display module 140 may display the time object 1330 so that the object may be recognized. Alternatively, according to an embodiment of the present invention, the control module 160 may enable only the timer function object 1320 to be displayed without displaying the time object 1330. The control module 160 may remove the timer function object 1320 when a timer function ends, and enable the time object 1330 to be displayed on a location where the timer function object 1320 has been arranged. Alternatively, according to an embodiment of the present invention, the control module 160 may enable the time object 1330 to be overlaid on a location where the timer function object is arranged. Accordingly, the display module 140 may display a screen on which the time object 1330 is arranged, on the background image 1310.

Figure 14:
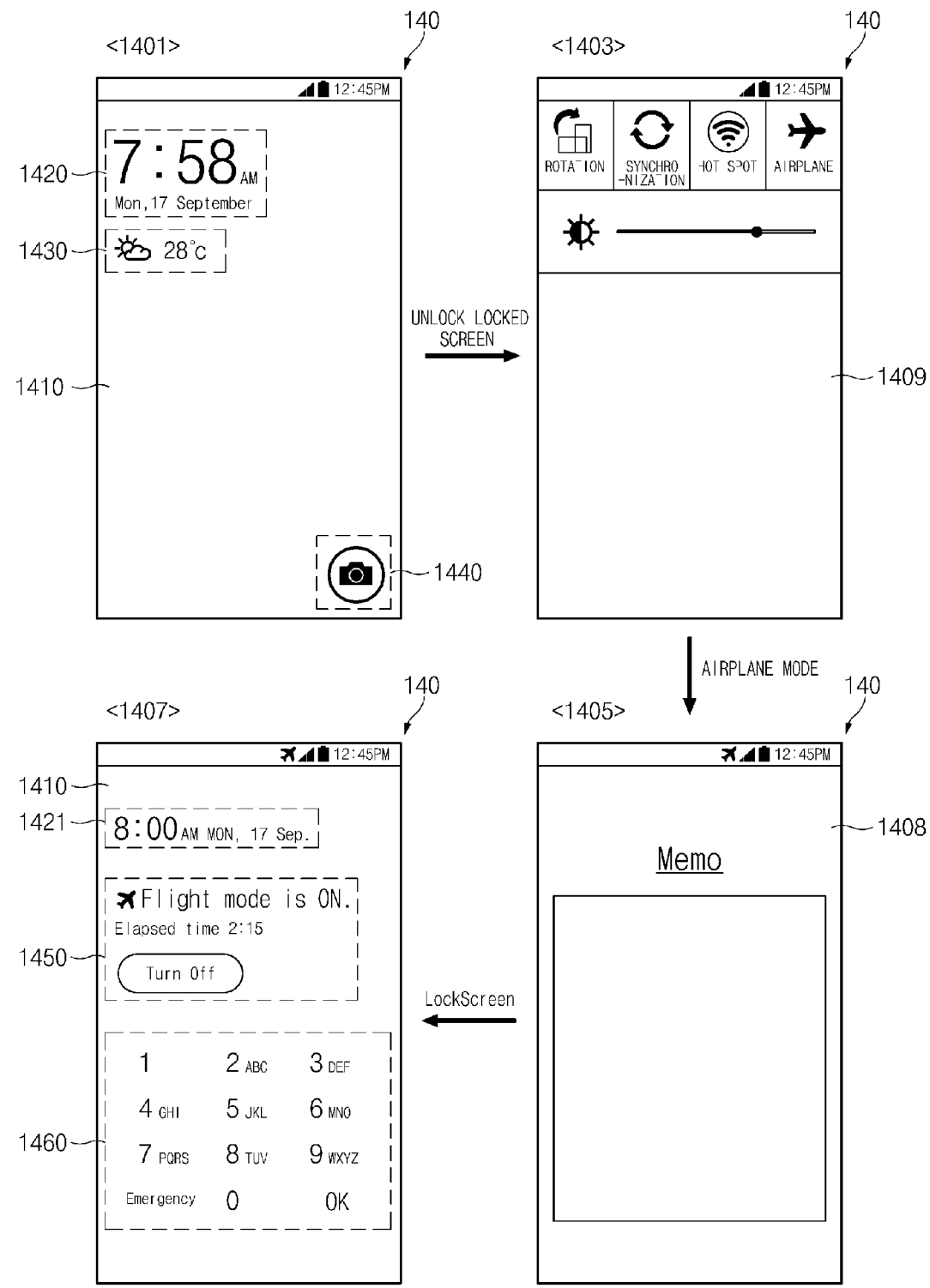
FIG. 14 is a diagram illustrating airplane-mode related event processing, according to an embodiment of the present invention.

FIG. 14 is a diagram illustrating airplane-mode related event processing, according to an embodiment of the present invention.

Referring to FIG. 14, the display module 140 displays an time object 1420, a weather object 1430, and a camera object 1440 on a background image 1410. A screen displayed may be a locked screen as shown in screen 1401.

In a locked-screen state, when an event related to the unlocking of a locked screen occurs, the control module 160 may unlock the locked screen. According to an embodiment of the present invention, the control module 160 may display a quick-panel screen 1409, as shown in screen 1403, when a quick-panel call event occurs. The quick-panel screen 1409 may include at least one quick item. Screen 1403 represents the quick-panel screen 1409 that includes a rotation item, a synchronization item, a hot spot item, and an airplane mode switch item. The embodiments of the present invention are not limited to the number or type of the above-described items. According to an embodiment of the present invention, the quick-panel screen 1409 may also be replaced with an icon screen or a menu screen on which an icon or menu item related to an airplane mode switch.

When an event related to an airplane mode setting occurs, the control module 160 may perform the airplane mode setting. The control module 160 displays an airplane mode related indicator on an indicator area in order to indicate the airplane mode setting, as shown in screen 1405. According to an embodiment of the present invention, when an event related to executing a specific function such as a memo function occurs, the control module 160 may enable a memo function execution screen 1408 to be displayed on the display module 140, as shown in screen 1405.

When an event related to locked-screen execution is received in a memo function execution screen 1408 state, the control module 160 may enable a locked screen related to an airplane mode to be displayed, as shown in screen 1407. The display module 140 displays a time object 1421, an airplane mode object 1450, and a number lock object 1460. The time object 1421 may be an object obtained by changing the time object 1420 according to the display of the airplane mode object 1450.

The number lock object 1460 may be an object connected to the airplane mode object 1450. For example, when an airplane mode is set and there is a locked-screen display request, the control module 160 may set the number lock object 1460 to be automatically displayed along with the airplane mode object 1450.

According to an embodiment of the present invention, a memo function may be a function connected to the airplane mode object 1450. The control module 160 may also enable the memo function object to be displayed instead of the number lock object 1460. Accordingly, the locked screen may display the time object 1421, the airplane mode object 1450, and the memo function object. Alternatively, the control module 160 may process a specific function executed immediately before displaying the airplane mode object 145, as a function associated with the airplane mode object 1450. Accordingly, the control module 160 may process a specific function executed immediately before displaying the airplane mode object 1450, such as a recording function or a timer function, as an associated function. In this context, the display module 140 may also display a recording function object or a timer function object along with the airplane mode object 1450.

The airplane mode object 1450 may include a virtual button for inactivating an airplane mode (Turn off). When the virtual button for inactivating the airplane mode is pressed, the control module 160 inactivates the airplane mode. The control module 160 may unlock the locked screen and display a screen according to airplane mode inactivation. For example, the control module 160 may unlock the locked screen, inactivate the airplane mode, and display the memo function execution screen 1408 represented in screen 1405. According to the airplane mode inactivation, the indicator of the indicator area on the screen 1405 may be changed.

According to an embodiment of the present invention, the control module 160 may also enable the airplane mode to be inactivated without unlocking the locked screen. The control module 160 may remove an airplane mode related indicator from the indicator area according to airplane mode inactivation. The display module 140 may display a locked screen, as shown in screen 1401, when the airplane mode is inactivated.

According to an embodiment of the present invention, even if an airplane mode inactivation event occurs, the control module 160 may maintain the display state of the airplane mode object 1450. The control module 160 may change the airplane mode object after the airplane mode is inactivated. For example, the control module 160 may enable the virtual button for inactivating the airplane mode (Turn-off) to be changed to the virtual button for activating the airplane mode (Turn-on). Accordingly, a user may easily process airplane mode inactivation or activation in a locked-screen state. As described above, the electronic device 100 may display a function related object to be able to process a specific function on a locked screen. In this process, the electronic device 100 may display, a function related object related to at least one function performed before a switch to a locked-screen state, on the locked screen.

Each of the above-described elements of the electronic device 100, according to embodiments of the present invention, may include one or more components and the names of corresponding elements may vary depending on the type of electronic device. The electronic device may include at least one of the above-described elements, and some elements may be left out or other elements may be included. Also, some of the elements of the electronic device are combined to form an entity, which may equally perform the functions of corresponding elements before being combined.

The term "module" used in embodiments of the present invention may mean a unit including one of hardware, software, and firmware, for example, or a combination of two or more thereof. The "module" may be interchangeably used with the term "unit", "logic", "logical block", "component", or "circuit", for example. The "module" may be an elementary unit of or a portion of an integral component. The "module" may also be an elementary unit for performing one or more functions or a portion of the elementary unit. The "module" may be implemented mechanically or electronically. For example, the "module" may include at least one of an Application-Specific Integrated Circuit (ASIC) chip, a Field-Programmable Gate Array (FPGA) and a programmable-logic device that performs some operations as has been known or will be developed.

According to embodiments of the present invention, at least a portion of the device (such as units or functions) or method (such as operations) may be implemented as a command stored in a computer-readable storage medium in the form of a programming module, for example. When the command is executed by one or more processors, the one or more processors may execute a function corresponding to the command. The computer readable storage medium may be the storage unit 150, for example. At least a portion of the programming module may be implemented (e.g., executed) by the processor. At least a portion of the programming module may include a module, a program, a routine, a set of instructions, or a process for executing one or more functions.

The computer readable storage medium may include a hardware device that is especially configured to store and execute a program command (such as a programming module), including a magnetic media such as a hard disk, a floppy disk and a magnetic tape, an optical media such as a Compact Disc Read Only Memory (CD-ROM), and a Digital Versatile Disc (DVD), and a magneto-optical media such as a floptical disk, a Read Only Memory (ROM), a Random Access Memory (RAM), and a flash memory. Also, the program command may include a machine code made by a compiler as well as a high-level language code that may be executed by a computer by using an interpreter. The above-described hardware device may be configured to operate by one or more software modules to execute the operations of the present invention and vice versa.

The module or programming module according to the present invention may include at least one of the above-described elements and some elements may be left out or other elements may be further included. Operations executed by a module, a programming module, or another element, according to embodiments of the present invention, may be executed by using a sequential, parallel, repetitive, or heuristic method. Also, the execution order of some operations may vary, some operations may be left out or further operations may be added.

As discussed above, according to the screen display method and the electronic device supporting the same, various embodiments of the present invention may process a screen change according to event reception or processing depending on a specific function screen, and thus, process the screen change more smoothly.

Accordingly, various embodiments of the present invention enable a user to more easily perform screen recognition according to event occurrence.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for displaying a screen on an electronic device, the method comprising the steps of:
    displaying a locked screen on which at least one object is arranged; and
    overlaying, on the locked screen, a layer including event information corresponding to an event, which has a size corresponding to an object of the locked screen when the event occurs,
    wherein a portion of a background image related to the object is displayed on the layer.

2. The method according to claim 1, further comprising:
    displaying the event information in a first area at which the at least one object is arranged or a second area at which the at least one object is not arranged, according to a comparison of an attribute of the event and an attribute of the at least one object.

3. The method according to claim 1, further comprising:
    determining a size of the at least one object, and adjusting a size of the event information to correspond to the size of the at least one object; and
    displaying the event information in a location at which the at least one object is arranged.

4. The method according to claim 1, further comprising:
    displaying the event information with a color associated with a background image of the locked screen.

5. The method according to claim 1, further comprising:
    displaying the event information in a location at which an object corresponding to a size of the event information is arranged.

6. The method according to claim 1, wherein:
    the event comprises at least one of a communication related event and a specified time related event, and the at least one object comprises at least one of a first object having an attribute to display information and a second object having an attribute to execute a specific function when selected.

7. The method according to claim 1, further comprising overlaying the event information on an area at which the at least one object is arranged.

8. The method according to claim 1, further comprising:
overlaying a layer on the locked screen; and
displaying the event information on the layer,
wherein a same background image is displayed on the locked screen and the layer.

9. The method according to claim 1, further comprising:
selecting a first object to be maintained on the locked screen or a second object to be removed from the locked screen according to attributes of the first and second objects; and
overlaying the layer on a location of the second object.

10. An electronic device comprising:
a memory; and
a processor coupled to the memory and configured to:
display a locked screen on which at least one object is arranged,
overlay, on the locked screen, a layer including event information corresponding to an event, which has a size corresponding to an object of the locked screen when the event occurs,
wherein a portion of a background image related to the object is displayed on the layer.

11. The electronic device according to claim 10, wherein the processor is further configured to:
display the event information in a first area at which the at least one object is arranged or a second area at which the at least one object is not arranged, according to a comparison of an attribute of the event with an attribute of the at least one object.

12. The electronic device according to claim 10, wherein the processor is further configured to:
determine a size of the at least one object, and adjust a size of the event information to correspond to the size of the at least one object; and
display the event information in a location at which the at least one object is arranged.

13. The electronic device according to claim 10, wherein the processor is further configured to:
display the event information with a color associated with a background image of the locked screen.

14. The electronic device according to claim 10, wherein the processor is further configured to:
display the event information in a location at which an object corresponding to a size of the event information is arranged.

15. The electronic device according to claim 10, wherein:
the event comprises at least one of a communication related event and a specified time related event, and
the at least one object comprises at least one of a first object having an attribute to display information and a second object having an attribute to execute a specific function when selected.

16. The electronic device according to claim 10, wherein the processor is further configured to overlay the event information on an area at which the at least one object is arranged.

17. The electronic device according to claim 10, wherein the processor is further configured to overlay a layer on the locked screen, and display the event information on the layer, and
the same background image as that of the locked screen is displayed on the layer.

18. The electronic device according to claim 10, wherein the processor is further configured to select a first object to be maintained on the locked screen and a second object to be removed from the locked screen according to attributes of the first and second objects, and overlay the layer on a location of the second object.

* * * * *